(12) United States Patent
Matsunaga et al.

(10) Patent No.: US 7,210,803 B2
(45) Date of Patent: May 1, 2007

(54) OPTICAL SYSTEM, DISPLAY OPTICAL SYSTEM AND IMAGE-TAKING OPTICAL SYSTEM

(75) Inventors: Motomi Matsunaga, Tochigi (JP); Shoichi Yamazaki, Kanagawa (JP); Kazutaka Inoguchi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 6 days.

(21) Appl. No.: 10/767,490

(22) Filed: Jan. 28, 2004

(65) Prior Publication Data

US 2004/0184152 A1 Sep. 23, 2004

(30) Foreign Application Priority Data

Jan. 31, 2003 (JP) ............... 2003-025305

(51) Int. Cl.
*G02B 5/08* (2006.01)

(52) U.S. Cl. .............. 359/857; 359/850; 359/572; 359/574

(58) Field of Classification Search ........... 359/566, 359/572, 574, 850, 630–633, 857–863
See application file for complete search history.

(56) References Cited

U.S. PATENT DOCUMENTS 5,436,763 A 7/1995 Chen et al.
5,917,662 A * 6/1999 Sekita .............. 359/729
6,687,057 B1 * 2/2004 Yamazaki .......... 359/637
2001/0009478 A1 7/2001 Yamazaki et al.
2002/0039232 A1 * 4/2002 Takeyama .......... 359/566
2003/0107816 A1 * 6/2003 Takagi et al. ...... 359/631

FOREIGN PATENT DOCUMENTS

| JP | 8-50256 A | 2/1996 |
|---|---|---|
| JP | 8-160340 A | 6/1996 |
| JP | 8-179238 A | 7/1996 |
| JP | 2705880 B2 | 10/1997 |
| JP | 7-333551 A | 12/1999 |
| JP | 2001-4955 A | 1/2001 |
| JP | 2001-142025 A | 5/2001 |

* cited by examiner

*Primary Examiner*—Drew A. Dunn
*Assistant Examiner*—Joshua L. Pritchett
(74) *Attorney, Agent, or Firm*—Morgan & Finnegan LLP

(57) ABSTRACT

An optical system is disclosed with which higher magnification can be easily achieved and aberrations can be favorably corrected, yet is compact. The optical system includes a plurality of optical surfaces including a first surface which has at least a reflective action, a second surface reflecting the light rays reflected by the first surface back toward the first surface, and a diffractive optical surface. The first surface reflects a central field-angle principal ray, which comes from the second surface and is again incident on the first surface, to the opposite side of the previous reflection with respect to a normal at a hit point of the central field-angle principal ray on the first surface.

27 Claims, 15 Drawing Sheets

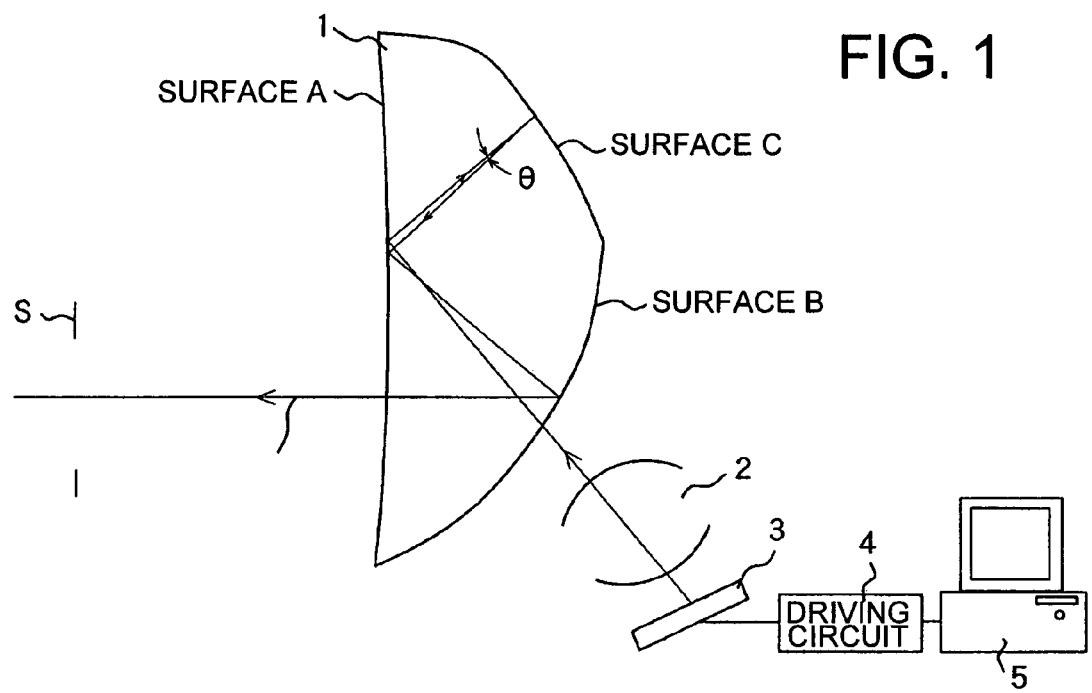
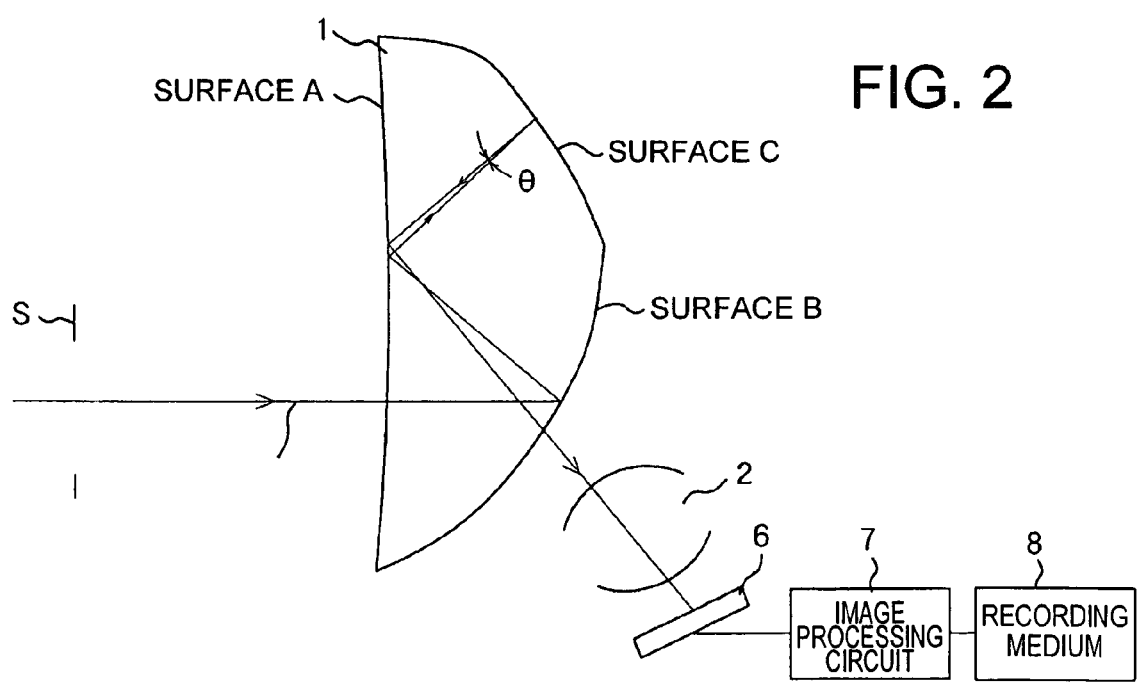

OPTICAL SYSTEM, DISPLAY OPTICAL SYSTEM AND IMAGE-TAKING OPTICAL SYSTEM

BACKGROUND OF THE INVENTION

1. Field of the Invention

The present invention relates to display optical systems which are used in head-mounted displays and projectors for enlarged display of an original image, an moreover to optical systems which are suitable for image-taking optical systems used in digital cameras or the like.

2. Description of Related Art

Head-mounted displays, which can be worn on one's head, are one type of image display apparatus using an image forming device, such as a CRT or an LCD, for an enlarged display, via an optical system, of an original image displayed on this image forming device.

Head-mounted displays are worn on the viewer's head, so that the overall apparatus must be particularly compact and light-weight. Considering weight balance and appearance, it is preferable that they are slim with respect to the viewer's visual axis (front-to-back direction). Furthermore, in order to make the enlarged image that is displayed attractive, the enlarged image should be as large as possible.

Japanese Patent Application Laid-Open Nos. H07 (1995)-333551 (corresponds to US Patent Application Publication No. 2001-0009478), H08 (1996)-50256 (corresponds to U.S. Patent Application Publication No. 2001-0009478), H08 (1996)-160340, and H08 (1996)-179238 (corresponds to U.S. Patent Application Publication No. 2001-0009478), for example, propose image display apparatuses striving for a thinner overall apparatus, which use an LCD (liquid crystal display) as the image forming device and a thin prism as the viewing optical system.

FIG. 17 shows the optical system (display optical system) of the image display apparatus proposed in H07 (1995)-333551. In this optical system, light emitted from an LCD 111 is incident on an incident surface 113 of a small decentered prism 112. The light is bent between a total reflective surface 114 and a reflective surface 115 of the prism 112, which are curved, and then the light emerges from the decentered prism 112 through the surface 114 and is guided to the viewer's eye E. Thus, a virtual image of an original image formed by the LCD 111 is formed, and the viewer views this virtual image.

The reflective surface 115 of the decentered prism 112 is made of a decentered rotationally asymmetric surface (a free-form surface in which the optical power depends on the azimuth angle).

Moreover, the display optical system in FIG. 18 is of a type with an image forming device 101 and using a coaxial concave mirror 103 and a half-mirror 102 that is tilted 45° with respect to the optical axis of the eyeball. In the image display apparatus shown in FIG. 17, it is easier than in the apparatus shown in FIG. 18 to make the overall apparatus thin and to achieve a broad field angle of the viewed visual field.

Furthermore, an image display apparatus of high image quality has been proposed, which produces chromatic aberration that is opposite to the chromatic aberration caused by the refraction optical system and suppresses the aberrations of the overall optical system by using a diffractive optical surface within the optical system.

For example, Japanese Patent Application Laid-Open No. 2001-142025 proposes an optical system which arranges a diffractive optical surface on one surface of a prism made of three surfaces constituting an eyepiece optical system, and corrects decentration chromatic aberration while making the overall apparatus thinner.

Moreover, Japanese Patent 2705880 (corresponds to U.S. Pat. No. 5,436,763) proposes an optical system in which an intermediate image is formed by a relay optical system on which a diffractive optical surface is arranged, an eyepiece optical system having a concave mirror is arranged and decentered, and an image formed by the image forming device is guided to the viewer.

Furthermore, Japanese Patent Application Laid-Open No. 2001-004955 proposes an optical system including a prism made of at least three surfaces, in which light emitted from a light source (LED or laser diode or the like) is scanned to project an image and form an intermediate image of that image using a relay optical system on which a diffractive optical surface is arranged, and the image is guided to the viewer by an eyepiece optical system having a concave mirror that is arranged and decentered.

In recent years, the structures of image forming devices, such as LCDs and the like, have-becoming ever finer, and image forming devices have been developed which are miniaturized while having a similar number of pixels as conventionally. Using such miniaturized image forming devices is advantageous for making systems smaller, but it causes the need to increase the magnification of the optical system in order to attain the same broad field angle as conventionally.

However, when an intermediate image is formed within the optical system in order to increase the magnification, then there is the problem that the optical path length becomes long and the apparatus becomes large.

SUMMARY OF THE INVENTION

It is an object of the present invention to present a compact optical system with which higher magnification can be attained easily, and aberrations can be corrected favorably.

According to one aspect of the present invention, an optical system having a plurality of optical surfaces comprises a first surface, which has at least a reflective action, and a second surface reflecting the light rays reflected by the first surface back toward the first surface. And the plurality of optical surfaces includes at least one diffractive optical surface.

The first surface reflects a central field-angle principal ray, which comes from the second surface and is again incident on the first surface, to the opposite side of the previous reflection with respect to a normal at a hit point of that central field-angle principal ray on the first surface.

These and further objects and features of the optical system according to the present invention will become apparent from the following detailed description of preferred embodiments thereof taken in conjunction with the accompanying drawings.

BRIEF DESCRIPTION OF THE DRAWINGS

FIG. 1 shows the structure of a display optical system according to Embodiment 1 of the present invention FIG. 2 shows the structure of an image-taking optical system according to Embodiment 2 of the present invention

DETAILED DESCRIPTION OF THE PREFERRED EMBODIMENTS

Figure 3:
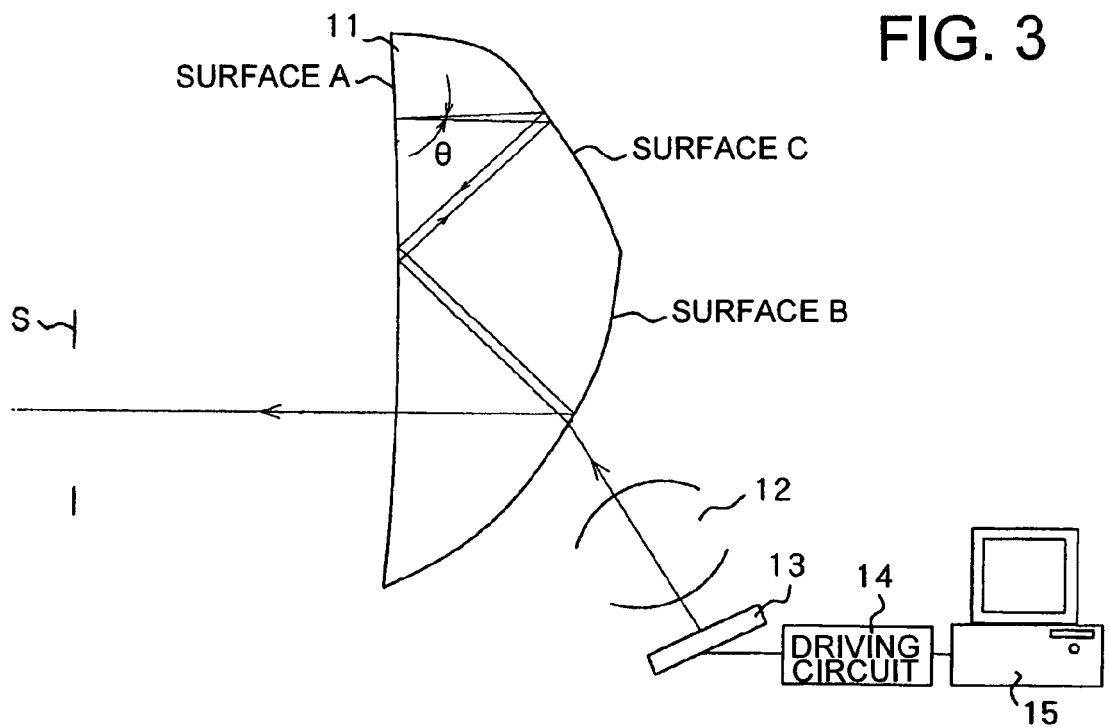
FIG. 3 shows the structure of a display optical system according to Embodiment 3 of the present invention

The following is a description of embodiments of the present invention, with reference to the accompanying drawings.

Embodiment 1

FIG. 1 shows the structure of an optical system (display optical system) according to Embodiment 1 of the present invention, which is used for an image display apparatus such as a head-mounted display or projector.

Reference numeral 1 denotes an optical element constituting a first optical system. The optical element 1 includes three optical surfaces A, B and C, which are arranged on a transparent member (prism member) filled with a transparent medium whose refractive index is larger than 1. The surface A (first surface) and the surface B (third surface) are both transmissive-reflective surfaces which act as both transmissive surfaces and reflective surfaces, whereas the surface C (second surface) is a reflective surface which acts as a diffractive optical surface. Moreover, the surfaces A, B and C are all decentered surfaces which are decentered with respect to a central field-angle principal ray, which is explained below. Also, the below-described returning reflection at the surface C is due to a reflective film formed on the surface C.

Reference numeral 2 denotes a second optical system. Reference numeral 3 denotes an image forming device, which forms an original image, such as an LCD (liquid crystal display) or EL (electroluminescence) display. This image forming device 3 is connected to a driving circuit 4, which is supplied with image signals from an image information supplying apparatus 5, such as a personal computer, a video deck or a DVD player. Image signals from the image supplying apparatus 5 are input into the driving signal, and the driving circuit 4 drives the image forming device 3 such that an original image corresponding to the image signal input by the driving circuit 4 is formed (displayed). S denotes an exit pupil of the display optical system made of the optical element 1 and the second optical system 2.

FIG. 1 shows, as an example of light emitted from the image forming device 3, a light ray that is emitted at the center of the display surface (effective image forming surface) of the image forming device 3 and that reaches the center of the exit pupil S (this light ray is referred to here as "central field-angle principal ray."

The light emitted from the image forming device 3 is guided via the second optical system 2 to the optical element 1. The light enters the optical element 1 from the surface B, and after it is reflected by the surface A, it is guided to the surface C. The light incident on the surface C undergoes a returning reflection to substantially the opposite side, and proceeds in a direction opposite to the light before the reflection at the surface C.

The light that has undergone a returning reflection at the surface C is again reflected by the surface A. Here, the surface A, which is the first surface, reflects the central field-angle principal ray that has been reflected by the surface C, which is the second surface, and is again incident on the surface A, to the opposite side, with respect to the normal at the hit point of the principal ray on the surface A, of the previous reflection (that is, the reflection by the surface A of the light incident on the surface A from the surface B).

The light that has been again reflected by the surface A is reflected by the surface B, emerges from the optical element 1 through the surface A, and reaches the exit pupil S, projecting an image on a projection surface, such as the viewer's eye or a screen.

Moreover, in the optical element 1, the light travels along the various surfaces in the following order: surface B→surface A→surface C (returning reflection)→surface A→surface B→surface A. After undergoing a returning reflection at the surface C and until reaching the surface B, which is the final reflective surface, the light travels along the same optical path in opposite direction. That is to say, the first half of the optical path in the optical element 1 is given by surface B→surface A→surface C, whereas the second half of that optical path is given by surface C→surface A→surface B.

It should be noted that in this embodiment, a surface having a returning reflection action serving as the turning point between the first half and the second half of the optical path, like the surface C, is referred to as "returning reflection surface" (the same is also true for the following embodiments).

Thus, it is possible to fit a long optical path length within a compact optical element 1, by bending the optical path with a plurality of decentered reflective surfaces A, B and C, and letting the first half of the optical path substantially overlap with the second half of the optical path. As a result, the overall display optical system can be made compact.

Moreover, by forming a returning optical path within the display optical system, and by providing the surface C with two functions, namely the function as a returning reflection surface which lets the optical paths overlap and the function as a diffractive optical surface which contributes to the correction of chromatic aberration and decentration aberration, it is possible to correct aberrations efficiently and to attain a superior optical performance. Moreover, it is possible to eliminate unnecessary surfaces from the display optical system, to make the display optical system compact, and to correct chromatic aberration, which is generated by the refraction of the light at the surfaces A and B.

By using this display optical system to configure an image display apparatus which projects an image on a projection surface, such as the viewer's eye or a screen, it is possible to realize an image display apparatus which is compact, which has a large field angle, and which is capable of displaying a high-quality image with favorably corrected chromatic aberration and decentration aberration.

It should be noted that this embodiment has been described for the case that the surface C serves as the diffractive optical surface, but it is also possible to arrange the diffractive optical surface in the second optical system 2. Also in this case, it is possible to eliminate unnecessary surfaces from the display optical system, to make the overall display optical system compact, to achieve the effect of correcting chromatic aberration, and to make it easy to correct the decentration aberration generated by the optical element 1, so that an image display apparatus with superior optical performance can be provided.

Moreover, this embodiment has been described for the case that the returning optical path is formed by an optical element 1 which is made of a transparent material, but the optical element 1 may also be made by combining a plurality of mirror members.

If the reflection at the surface A is an internal total reflection in the optical element 1, then the lost light amount is small, which is preferable. If, at least at a region of the surface A at which both the reflecting light and the emerging light are incident, the reflection is an internal total reflection, then, compared to the case that all of the reflecting light undergoes an internal total reflection, the degree of freedom of design is increased while the same level of brightness is ensured. In this case, the reflection at the surface A that is not an internal total reflection is a reflection by a reflective film.

Embodiment 2

In the foregoing Embodiment 1, a display optical system used for an image display apparatus was described, but the same optical system can also be used for an image-taking (image-forming) optical system used in an image-taking apparatus.

FIG. 2 shows the structure of an optical system (image-taking optical system) of an image-taking apparatus, such as a digital still camera or a video camera, according to Embodiment 2 of the present invention.

Reference numeral 1 denotes an optical element constituting a first optical system. The optical element 1 includes three optical surfaces A, B and C which are arranged on a transparent member (prism member) filled with a transparent medium whose refractive index is larger than 1. The surface A (first surface) and the surface B (third surface) are both transmissive-reflective surfaces which act as both transmissive surfaces and reflective surfaces, whereas the surface C (second surface) is a reflective surface which acts as a diffractive optical surface. Moreover, the surfaces A, B and C are all decentered surfaces which are decentered with respect to a central field-angle principal ray, which is explained below. Also, the below-described returning reflection at the surface C is a reflection due to a reflective film formed on the surface C.

Reference numeral 2 denotes a second optical system. Reference numeral 6 denotes an image-pickup device (photoelectric conversion device) for photoelectric conversion, such as a CCD sensor or a CMOS sensor. S denotes an entrance pupil of the image-taking optical system made of the optical element 1 and the second optical system 2. At this position, an aperture stop is arranged, which prevents unnecessary light from entering the optical element 1.

FIG. 2 shows, as an example of light entering the image-taking optical system from the outside, a light ray which passes through the center of the entrance pupil S and reaches the center of the light-receiving surface (effective light-receiving surface) of the image-pickup device 6 (this light ray is referred to here as "central field-angle principal ray.")

The light coming from the outside enters the optical element 1 through the surface A, is reflected by the surface B, reflected by the surface A, and then guided to the surface C. The light incident on the surface C undergoes a returning reflection to the substantially opposite side, and is again reflected by the surface A.

Here, the surface A, which is the first surface, reflects the central field-angle principal ray that has been reflected by the surface C, which is the second surface, and is again incident on the surface A, to the opposite side, with respect to the normal at the hit point of the principal ray on the surface A, of the previous reflection (that is, the reflection by the surface A of the light incident on the surface A from the surface B).

The light that is again reflected by the surface A and travels toward the surface B, emerges from the optical element 1 through the surface B, and travels toward the second optical system 2. The light that has passed through the second optical system 2 is guided to the image-pickup device 6 and forms an image on the light-receiving surface of the image-pickup device 6. With the photoelectric conversion of the image-pickup device 6, it is possible to obtain an image signal of the external image (object image).

The image signal from the image-pickup device 6 is subjected to image processing with the image-processing circuit 7, and is recorded on a recording medium 8, such as a semiconductor memory, a magnetic disk, an optical disk or the like.

In the optical element 1 of the present embodiment, the light travels along the various surfaces in the following order: surface A→surface B→surface A→surface C (returning reflection)→surface A→surface B. After undergoing a returning reflection at the surface C and until reaching the surface B, which is the final transmissive surface, the light travels along the same optical path in opposite direction. That is to say, the first half of that optical path in the optical element 1 is given by surface B→surface A→surface C, whereas the second half of that optical path is given by surface C→surface A→surface B.

Thus, it is possible to fit a long optical path length within a compact optical element 1, by bending the optical path with a plurality of decentered reflective surfaces A, B and C, and letting the first half of the optical path substantially overlap with the second half of the optical path. As a result, the image-taking optical system, and moreover the overall image-taking apparatus can be made compact.

Moreover, by forming a returning optical path within the image-taking optical system, and by providing the surface C with two functions, namely the function as a returning reflection surface which lets the optical paths overlap and the function as a diffractive optical surface which contributes to the correction of chromatic aberration and decentration aberration, it is possible to correct aberrations efficiently and to attain a superior optical performance. Moreover, it is possible to eliminate unnecessary surfaces from the image-taking optical system, to make the image-taking optical system compact, and to correct chromatic aberration, which is generated by the refraction at the surfaces A and B.

By using this image-taking optical system to configure an image-taking apparatus, it is possible to realize an image-taking apparatus which is compact, which has a large field angle, and which is capable of taking high-quality images with favorably corrected chromatic aberration and decentration aberration.

It should be noted that this embodiment has been described for the case that the surface C serves as the diffractive optical surface, but it is also possible to arrange the diffractive optical surface in the second optical system 2. Also in this case, it is possible to eliminate unnecessary surfaces from the image-taking optical system, to make the overall image-taking optical system compact, to achieve the effect of correcting chromatic aberration, and furthermore to make it easier to correct the decentration aberration which occurs at the optical element 1, so that an image image-taking apparatus with superior optical performance can be provided.

Moreover, this embodiment has been described for the case that a returning optical path is formed by an optical element 1 which is made of a transparent material, but the optical element 1 may also be made by combining a plurality of mirror members.

If the reflection at the surface A is an internal total reflection in the optical element 1, then the lost light amount is small, which is preferable. If, at least at a region of the surface A at which both the reflecting light and the emerging light are incident, the reflection is an internal total reflection, then, compared to the case that all of the reflecting light undergoes an internal total reflection, the degree of freedom of design is increased while the same level of brightness is ensured. In this case, the reflection at the surface A that is not an internal total reflection is a reflection by a reflective film.

Embodiment 3

FIG. 3 shows the structure of a display optical system of an image display apparatus, such as a head-mounted display or projector, according to Embodiment 3 of the present invention.

Reference numeral 11 denotes an optical element constituting the optical system. The optical element 11 includes three optical surfaces A, B and C which are arranged on a transparent member (prism member) filled with a transparent medium whose refractive index is larger than 1. The surface A (first surface) and the surface B (third surface) are both transmissive-reflective surfaces which act as both transmissive surfaces and reflective surfaces, whereas the surface C (second surface) is a reflective surface which acts as a diffractive optical surface. Moreover, the surfaces A, B and C are all decentered surfaces which are decentered with respect to a central field-angle principal ray, which is explained below. Also, the below-described returning reflection at the surface C is a reflection due to a reflective film formed on the surface C.

Reference numeral 12 denotes a second optical system. Reference numeral 13 denotes an image forming device which forms an original image, such as an LCD (liquid crystal display) or EL (electroluminescence) display. This image forming device 13 is connected to a driving circuit 14, which is supplied with image signals from an image information supplying apparatus 15, such as a personal computer, a video deck or a DVD player. Image signals from the image supplying apparatus 15 are input into the driving circuit 14, and the driving circuit 14 drives the image forming device 13 such that an original image corresponding to the input image signal is formed (displayed). S denotes an exit pupil of the display optical system made of the optical element 11 and the second optical system 12.

FIG. 3 shows, as an example of light emitted from the image forming device 13, a light ray that is output at the center of the display surface (effective image forming surface) of the image forming device 13 and that reaches the center of the exit pupil S (this light ray is referred to here as "central field-angle principal ray.")

The light emitted from the image forming device 13 is guided via the second optical system 12 to the optical element 11. The light enters the optical element 11 from the surface B, and after it is reflected by the surface A, it is reflected by the surface C and guided to the surface A. The light incident on the surface A undergoes a returning reflection to substantially the opposite side, and proceeds in a direction opposite to the light before the returning reflection at the surface A.

The light reflected by the surface A is again reflected by the surface C, and then-again reflected by the surface A. Here, the surface A, which is the first surface, reflects the central field-angle principal ray that has been reflected by the surface C, which is the second surface, and is again incident on the surface A, to the opposite side, with respect to the normal at the hit point of the principal ray on the surface A, of the previous reflection (that is, the reflection by the surface A of the light incident on the surface A from the surface B). This relation is also the same for the two reflections at the surface C.

The light that is again reflected by the surface A is reflected by the surface B, emerges from the optical element 11 through the surface A, and reaches the exit pupil S, projecting an image on a projection surface, such as the viewer's eye or a screen.

Moreover, in the optical element 11, the light travels along the various surfaces in the following order: surface B→surface A→surface C→surface A (returning reflection) →surface C→surface A→surface B→surface A. After undergoing a returning reflection at the surface A and until reaching the surface B, which is the final reflective surface, the light travels along the same optical path in opposite direction. That is to say, the first half of that optical path in the optical element 11 is given by surface B→surface A→surface C→surface A, whereas the second half of that optical path is given by surface A→surface C→surface A→surface B.

Thus, it is possible to fit a long optical path length within a compact optical element 11, by bending the optical path with a plurality of decentered reflective surfaces A, B and C, and letting the first half of the optical path substantially overlap with the second half of the optical path. As a result, the overall display optical system can be made compact.

Moreover, by forming a returning optical path within the display optical system, and by providing the surface C with two functions, namely the function as a returning reflection surface which lets the optical paths overlap and the function as a diffractive optical surface which contributes to the correction of chromatic aberration and decentration aberration, it is possible to correct aberrations efficiently and to attain a superior optical performance. Moreover, it is possible to eliminate unnecessary surfaces from the display optical system, to make the display optical system compact, and to correct chromatic aberration, which is generated by the refraction of the light at the surfaces A and B.

By using this display optical system to configure an image display apparatus which projects an image on a projection surface, such as the viewer's eye or a screen, it is possible to realize an image display apparatus which is compact, which has a large field angle, and which is capable of displaying a high-quality image with favorably corrected chromatic aberration and decentration aberration.

It should be noted that this embodiment has been described for the case that the surface C serves as the diffractive optical surface, but it is also possible to arrange the diffractive optical surface in the second optical system 2. Also in this case, it is possible to eliminate unnecessary surfaces from the display optical system, to make the overall display optical system compact, to achieve the effect of correcting chromatic aberration, and moreover to make it easier to correct the decentration aberration occurring at the optical element 11, so that an image display apparatus with superior optical performance can be provided.

Moreover, this embodiment has been described for the case that the returning optical path is formed by an optical element 11 which is made of a transparent material, but the optical element 11 may also be made by combining a plurality of mirror members.

If the reflection at the surface A is an internal total reflection in the optical element 11, then the lost light amount is small, which is preferable. If, at least at a region of the surface A at which both the reflecting light and the emerging light are incident, the reflection is an internal total reflection, then, compared to the case that all of the reflecting light undergoes an internal total reflection, the degree of freedom of design is increased while the same level of brightness can be ensured. In this case, the reflection at the surface A that is not an internal total reflection is a reflection by a reflective film.

Embodiment 4

In the foregoing Embodiment 3, a display optical system used for an image display apparatus was described, but the same optical system can also be used for an image-taking (image-forming) optical system used in an image-taking apparatus.

Figure 4:
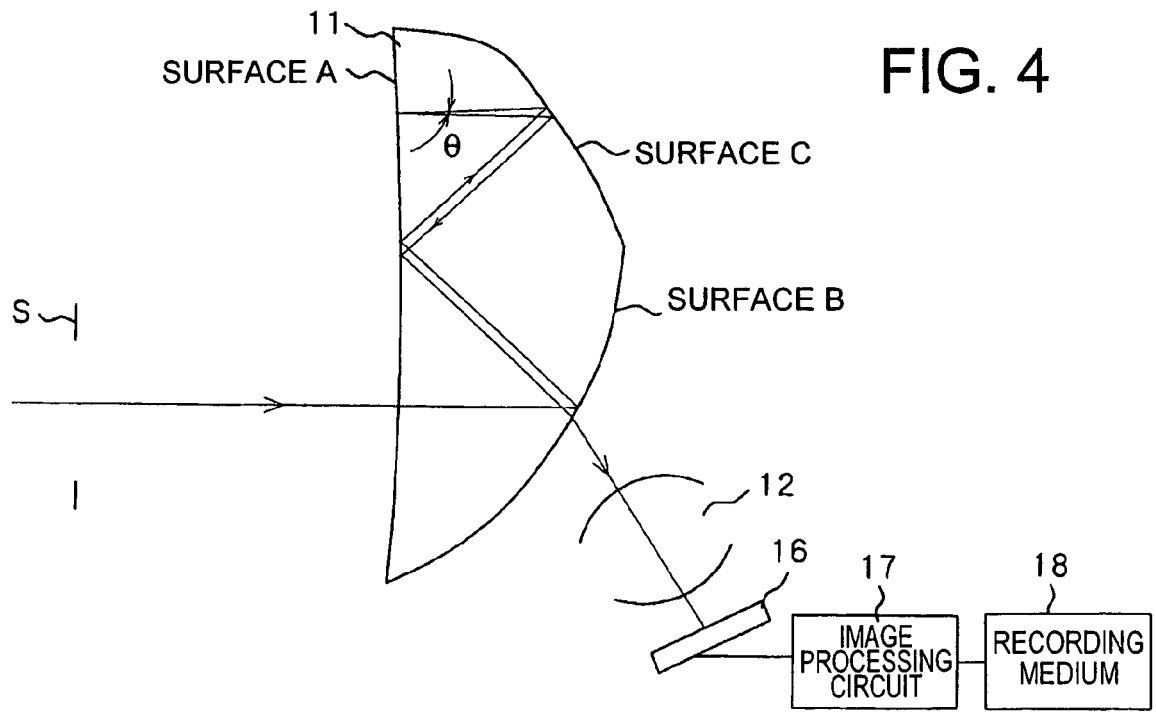
FIG. 4 shows the structure of an image-taking optical system according to Embodiment 4 of the present invention

FIG. 4 shows the structure of an optical system (image-taking optical system) of an image-taking apparatus, such as a digital still camera or a video camera, according to Embodiment 4 of the present invention.

Reference numeral 11 denotes an optical element constituting the optical system. The optical element 11 includes three optical surfaces A, B and C which are arranged on a transparent member (prism member) filled with a transparent medium whose refractive index is larger than 1. The surface A (first surface) and the surface B (third surface) are both transmissive-reflective surfaces which act as both transmissive surfaces and reflective surfaces, whereas the surface C (second surface) is a reflective surface which acts as a diffractive optical surface. Moreover, the surfaces A, B and C are all decentered surfaces that are decentered with respect to a central field-angle principal ray, which is explained below. Also, the below-described returning reflection at the surface C is a reflection due to a reflective film formed on the surface C. Furthermore, a half-transmissive-reflective film (half-mirror) is formed on the surface B.

Reference numeral 12 denotes a second optical system. Reference numeral 16 denotes an image-pickup device (photoelectric conversion device) for photoelectric conversion, such as a CCD sensor or a CMOS sensor. S denotes an entrance pupil of the image-taking optical system made of the optical element 11 and the second optical system 12. At this position, an aperture stop is arranged, which prevents unnecessary light from entering the optical element 11.

FIG. 4 shows, as an example of light entering the image-taking optical system from the outside, a light ray that passes through the center of the entrance pupil S and reaches the center of the light-receiving surface (effective light-receiving surface) of the image-pickup device 16 (this light ray is referred to here as "central field-angle principal ray.")

The light coming from the outside enters the optical element 11 through the surface A, is reflected by the surface B, reflected by the surface A, reflected by the surface C, and then guided to the surface A. The light incident on the surface A undergoes a returning reflection to the substantially opposite side, and proceeds in a direction that is opposite to that of the light before undergoing the returning reflection at the surface A.

The light that has undergone a returning reflection at the surface A is again reflected by the surface C, and then again reflected by the surface A. Here, the surface A, which is the first surface, reflects the central field-angle principal ray that has been reflected by the surface C, which is the second surface, and is again incident on the surface A, to the opposite side, with respect to the normal at the hit point of the principal ray on the surface A, of the previous reflection (that is, the reflection by the surface A of the light incident on the surface A from the surface B). This relation is also the same for the two reflections at the surface C.

The light that is again reflected by the surface A emerges from the optical element 11 through the surface B, and after passing through the second optical system 12, forms an image on the light-receiving surface of the image-pickup device 16. With the photoelectric conversion of the image-pickup device 16, it is possible to obtain an image signal of the external image (object image).

The image signal from the image-pickup device 16 is subjected to image processing with the image-processing circuit 17, and is recorded on a recording medium 18, such as a semiconductor memory, a magnetic disk, an optical disk or the like.

In the optical element 11, the light travels along the various surfaces in the following order: surface A→surface B→surface A→surface C→surface A (returning reflection) →surface C→surface A→surface B. After undergoing a returning reflection at the surface A and until reaching the surface B, which is the final transmissive surface, the light travels along the same optical path in opposite direction. That is to say, the first half of that optical path in the optical element 11 is given by surface B→surface A→surface C→surface A, whereas the second half of that optical path is given by surface A→surface C→surface A→surface B.

Thus, it is possible to fit a long optical path length within a compact optical element 11, by bending the optical path with a plurality of decentered reflective surfaces A, B and C, and letting the first half of the optical path substantially overlap with the second half of the optical path. As a result, the image-taking optical system, and moreover the overall image-taking apparatus can be made compact.

Moreover, by forming a returning optical path within the image-taking optical system, and by providing the surface C with two functions, namely the function as a returning reflection surface that overlaps the optical paths and the function as a diffractive optical surface which contributes to the correction of chromatic aberration and decentration aberration, it is possible to correct aberrations efficiently and to attain a superior optical performance. Moreover, it is possible to eliminate unnecessary surfaces from the image-taking optical system, to make the image-taking optical system compact, and to correct chromatic aberration, which is generated by the refraction of the light at the surfaces A and B.

By using this image-taking optical system to configure an image-taking apparatus, it is possible to realize an image-taking apparatus which is compact, which has a large field angle, and which is capable of taking high-quality images with favorably corrected chromatic aberration and decentration aberration.

It should be noted that this embodiment has been described for the case that the surface C serves as the diffractive optical surface, but it is also possible to arrange the diffractive optical surface in the second optical system 2. Also in this case, it is possible to eliminate unnecessary surfaces from the image-taking optical system, to make the overall image-taking optical system compact, to achieve the effect of correcting chromatic aberration, and furthermore to make it easier to correct the decentration aberration which occurs at the optical element 11, so that an image image-taking apparatus with superior optical performance can be provided.

Moreover, this embodiment has been described for the case that the returning optical path is formed by an optical element 11 which is made of a transparent material, but the optical element 11 may also be made by combining a plurality of mirror members.

If the reflection at the surface A is an internal total reflection in the optical element 11, then the lost light amount is small, which is preferable. If, at least at a region of the surface A at which both the reflecting light and the emerging light are incident, the reflection is an internal total reflection, then, compared to the case that all of the reflecting light undergoes an internal total reflection, the degree of freedom of design is increased while the same level of brightness can be ensured. In this case, the reflection at the surface A that is not an internal total reflection is a reflection by a reflective film.

In Embodiments 1 to 4, when the light ray (central field-angle principal ray) incident on the returning reflection surface of the optical element 1 or 11 is reflected, the principal ray (incident ray and reflected ray) forms a predetermined angle θ. It is preferable that this angle θ satisfies the condition:

$$|\theta|<60° \quad (1)$$

When this condition (1) is not met, then the optical path after the returning reflection (second half of the optical path) does not travel back the same way as the first half of the optical path, so that rather than overlapping optical paths, a zigzag optical path is formed, and the optical element 1 or 11 becomes large.

Preferable, the condition $$|\theta|<30° \quad (2)$$

is satisfied. When the Condition (2) is not met, then the optical path after the returning reflection (second half of the optical path) can travel back the same way as the first half of the optical path, but the first half and the second half of the optical path do not overlap, so that the extent to which the optical element 1 or 11 is made smaller is low.

Preferable, the condition $$|\theta|<20° \quad (3)$$

is satisfied. When the Condition (3) is satisfied, it is possible to achieve a sufficiently compact optical element 1 or 11.

The following is a description of specific numerical examples of the present invention. In conventional definitions that do not apply to a decentered system, each optical surface is expressed in a coordinate system taking the vertex of the respective surface as the reference. That is to say, taking the z-axis as the optical axis, the yz section is conventionally the meridional cross-section, and the xz section is the sagittal cross-section.

However, the optical systems described in the above embodiments are decentered systems, so that a local meridional cross-section and a local sagittal cross-section for these decentered systems are newly defined.

At the hit points of the central field-angle principal ray on the surfaces, the plane including the incident portion and the emergent portion of the central field-angle principal ray is defined as the "local meridional cross-section" and the plane including the hit point that is perpendicular to the local meridional cross-section and parallel to the sagittal cross-section (ordinary sagittal cross-section) of the coordinate system at the plane's vertex is defined as the "local sagittal cross-section."

The curvature near each surface's hit point of the central field-angle principal ray is calculated, and the curvature radius on the local meridional cross-section with respect to the central field-angle principal ray at each surface is defined as ry, and the curvature radius on the local sagittal cross-section is defined as rx. In this case, it is preferable that the diffractive optical surface (DOE surface) in the optical system satisfies the condition:

$$|ry/rx|<4 \quad (4)$$

If the shape of the DOE surface does not satisfy this Condition (4), then it cannot favorably suppress or correct the chromatic aberration or decentration aberration of the display optical system and the image-taking optical system.

NUMERICAL EXAMPLE 1

Figure 5:
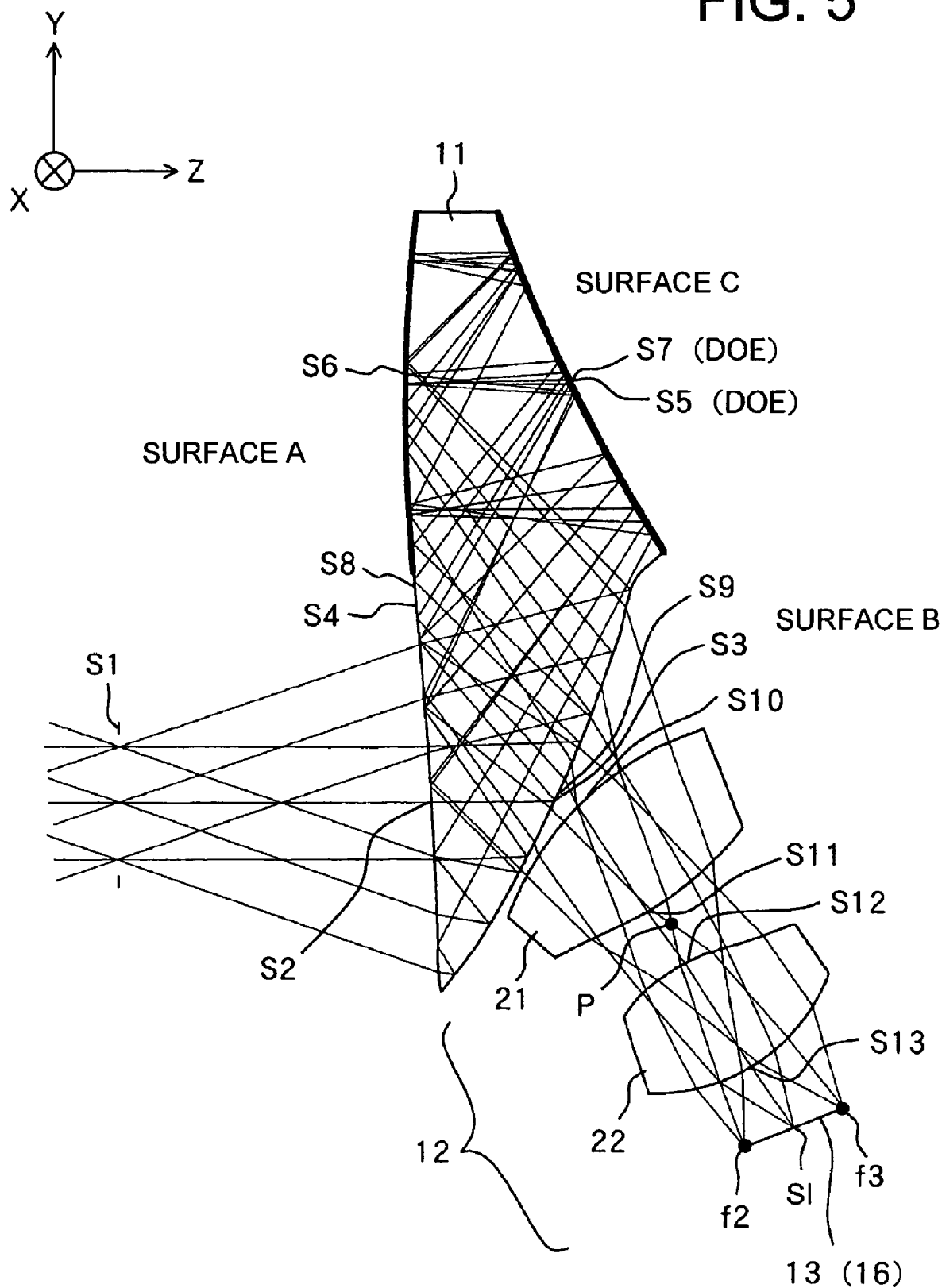
FIG. 5 shows a cross-sectional view of an optical system according to Numerical Example 1 of the present invention.

FIG. 5 is a cross-sectional view illustrating Numerical Example 1 of an optical system according to the present invention. This Numerical Example 1 corresponds to the above-described Embodiments 3 and 4. The optical element 11 is a prism-shaped transparent member, which is filled with an optical medium, and has three optical surfaces A to C, including a returning reflection surface (surface A).

S2, S4, S6 and S8 denote the same surface (surface A), and also S3 and S9 denote the same surface (surface B) Also S5 and S7 denote the same surface (surface C). S6 is the returning reflection surface, which has a returning reflection action, and S5 and S7 denote a DOE surface.

The second optical system 12 is made of the two optical elements 21 and 22, which respectively have two optical surfaces. The optical elements 21 and 22 are prism-shaped transparent members, which are filled with an optical medium.

All these surfaces are plane symmetric having the paper plane (yz-section) of the figure as their only symmetry plane. It should be noted that x, y and z in the figures define a coordinate system in which the z-axis is the direction of the viewer's visual axis or object viewing axis, the y-axis is the direction in the paper plane and perpendicular to the z-axis, and the x-axis is the direction perpendicular to the paper plane.

The optical data of this Numerical Example 1 is given in Table 1.

The following is an explanation of the meaning of the optical data in Table 1. It should be noted that these explanations are the same for all of the following numerical examples.

First of all, the column SURF on the left-hand side denotes the surface number. Taking the center of the surface S1 as the origin (0, 0, 0), X, Y, Z denote the position (x, y, z) of the surface's vertex in the coordinate system with the y-axis and the z-axis as shown in the figures, and the x-axis denoting the direction into the paper plane, and A denotes the rotation angle a (in degrees) of the rotation around the x-axis, taking the anti-clockwise direction as the positive direction.

R denotes the curvature radius. The column TYP denotes the type of the surface shape, where SPH is a spherical surface, and FFS is a rotationally asymmetric surface according to the following equation:

$$z=(1/R)(x^2+y^2)/(1+(1-(1+k)(1/R)^2(x^2+y^2))^{(1/2)})+c2+\\c4y+c5(x^2-y^2)+c6(-1+2x^2+2y^2)+c10(-2y+3x^2y+\\3y^3)+c11(3x^2y-y^3)+c12(x^4-6x^2y^2+y^4)+c13(-3x^2+\\4x^4+3y^2-4y^4)+c14(1-6x^2+6x^4-6y^2+12x^2y^2+\\6y^4)+c20(3y-12x^2y+10x^4y-12y^3+20x^2y^3+10y^5)+\\c21(-12x^2y+15x^4y+4y^3+10x^2y^3-5y^5)+c22(5x^4y-\\10x^2y^3+y^5)+c23(x^6-15x^4y^2+15x^2y^4-y^6)+c24(-\\5x^4+6x^6+30x^2y^2-30x^4y^2-5y^4-30x^2y^4+6y^6)+c25\\(6x^2-20x^4+15x^6-6y^2+15x^4y^2+20y^4-15x^2*y^4-\\15*y^6)+c26(-1+12x^2-30x^4+20x^6+12y^2-60x^2y^2+\\60x^4y^2-30y^4+60x^2y^4+20*y^6)+ \quad (5)$$

Moreover, the number next to FFS in the column TYP means that the surface has a rotationally asymmetric shape with the aspheric surface constants k and c as listed in the lower part of Table 1. Where c is not given, it's value is 0. Also, e-X means $10^{-X}$.

In the column TYP, DOE means diffractive optical surface, and the definition of the base surface is given as follows. For the shape of the base surface, first, the contour of the aspheric surface given by the following equation is defined in the local yz plane of the DOE surface:

$$z=Ry^2/\{1+[1-(1+k)R^2y^2]^{1/2}\}+Ay^4+By^6+Cy^8+Dy^{10}$$

where R denotes the curvature radius.

Next, when the value of RDX in the column indicating the shape of the DOE listed in the lower part of the table is $R_{dx}$, then the base surface is given by rotating the contour of the aspheric surface defined as above around an axis that passes through x=0 and z=-Rdx in the local coordinates of the DOE surface and that is parallel to the local y-axis of the DOE surface.

Moreover, in all DOE surfaces used in the numerical examples, k=0 and A=B=C=D=0.

Furthermore, the phase function given by the following equation is added to the base surface:

$$\phi(x,y)=2\pi/\lambda(c1x+c2y+c3x^2+c4xy+c5y^2+c6x^3+c7x^2y+\\c8xy^2+c9y^3+c10x^4+c11x^3y+c12x^2y^2+c13xy^3+\\c14y^4+c15x^5+c16x^4y+c17x^3y^2+c18x^2y^3+c19xy^4+\\c20y^5+c21x^6+c22x^5y+c23x^4y^2+c24x^3y^3+\\c25x^2y^4+c24xy^5+c27y^6)$$

The phase function of the DOE surfaces represents a rotationally asymmetric shape corresponding to the c listed in the lower part of the table. Where c is not given, it's value is 0.

Nd and vd respectively denote the refractive index and the Abbe number at the d-line wavelength of the medium following the surface. A change of the sign of the refractive index Nd signifies that light is reflected at that surface.

Moreover, if the medium is a layer of air, then only the refractive index Nd is given as 1.0000, and the Abbe number vd is omitted.

Moreover, the absolute value of the angle θ that is formed by the incident portion and the reflected portion of the central field-angle principal ray at the returning reflection surface is listed as |θ|.

Also listed are the curvature radius ry on the local meridional cross-section and the curvature radius rx on the local sagittal cross-section at the hit point of the central field-angle principal ray at the DOE surface, as well as the absolute value |ry/rx| of ry divided by rx.

If this optical system is used for a display optical system, and SI is the display surface of the original image of the image forming device 13, then the light from SI enters the optical element 22 through S13, emerges from it through S12, enters the optical element 21 through S11, and emerges from it through S10 toward the optical element 11.

The light traveling toward the optical element 11 enters the optical element 11 through S9, is reflected at S8, reflected at S7, is then reflected at S6 (returning reflection surface), reflected at S5, reflected at S4, reflected at S3, emerges from the optical element 11 through S2, and is guided to the exit pupil S1. During this, the light rays from both ends of the display surface of the image forming device 13 cross one another inside the optical element 11, and an intermediate image of the original image displayed on SI is formed.

By forming an intermediate image inside the optical element 11, a compact structure can be attained even when weakening the power of the second optical system 12, the occurrence of excessive aberrations in the second optical system can be suppressed, and the second optical system 12 can be kept from becoming complicated.

In this numerical example, the intermediate image is formed between the reflection at S7 and the reflection at S5, but it is not necessarily required that the intermediate image is formed in this interval. Moreover, in order to facilitate the correction of aberration of the eyepiece optical system portion converting the divergent light flux from the intermediate image points into a substantially parallel light flux, it is preferable that the intermediate image is formed with suitable curvature and astigmatic difference in consideration of the conditions leading to curvature of field and astigmatism at the eyepiece optical system portion.

Moreover, from the reflection of the light flux at S5 to its emergence at S2, the surfaces exerting an optical action on the light flux correspond to the portion of the eyepiece optical system, whereas the other portions of the optical element 11 and the second optical system 12 correspond to a relay optical system. The surface S3 acting as the final reflective surface is a concave mirror with very strong power compared to S2 acting as the emergent surface, and it is difficult to completely correct the aberrations at the eyepiece optical system portion. Therefore, it is possible to improve the image quality of the finally observed image by forming the intermediate image such that an intermediate image-forming surface is formed with such a shape that the relay optical system portion cancels the aberrations at the eyepiece optical system portion.

It should be noted that a reflective film is formed on the returning reflection surface S6 and the surface C (S5 and S7).

Moreover, by making the DOE surface a reflective surface, aberrations are corrected efficiently, and a favorable optical performance can be attained.

When the unit of length for the numerical values in Numerical Example 1 is taken to be mm, a display optical system is attained with which an image is displayed at infinity in the z-axis direction with an exit pupil diameter of φ10 mm, an image size of about 10 mm×7.5 mm, and a horizontal field angle of 50°.

Moreover, in this display optical system, of the most peripheral image on the local meridional cross-section, the light ray that passes through an outermost image height f3 that is further away from the exit pupil S1 and passes through the exit pupil center is defined as the f3 center light ray, and the light ray that passes through an outermost image height f2 that is closer to the exit pupil S1 and passes through the exit pupil center is defined as the f2 center light ray. In this case, the surface that passes through the point P at which the f3 center light ray and the f2 center light ray intersect is defined as the "pupil image-forming surface." This is the same in all numerical examples.

If this optical system is used for an image-taking optical system, then the light flux from an object point at infinity in negative z-axis direction passes through the aperture stop S1 and is guided to the optical element 11, enters the optical element 11 through S2, is reflected at S3, reflected at S4, reflected at S5, is then reflected at S6 (returning reflection surface), is reflected at S7, reflected at S8, emerges from the optical element 11 through S9, and is guided to the optical element 21. The light flux guided to the optical element 21 enters the optical element 21 through S10, emerges from it through S11, enters the optical element 22 through S12, emerges from it through S13, and forms an image on the light-receiving surface SI of the image-pickup device 16.

Of the light flux reflected at S4 and S8, the light flux emerging or entering from S2 that is reflected within the entrance or emergent region undergoes a total reflection, so that the loss of light is small. It should be noted that the reflection at the surface C and the reflection that is not an internal total reflection at the surface A are reflections due to a reflective film.

With this numerical example, it is possible to realize an optical system that is compact and has a broad field angle.

NUMERICAL EXAMPLE 2

Figure 6:
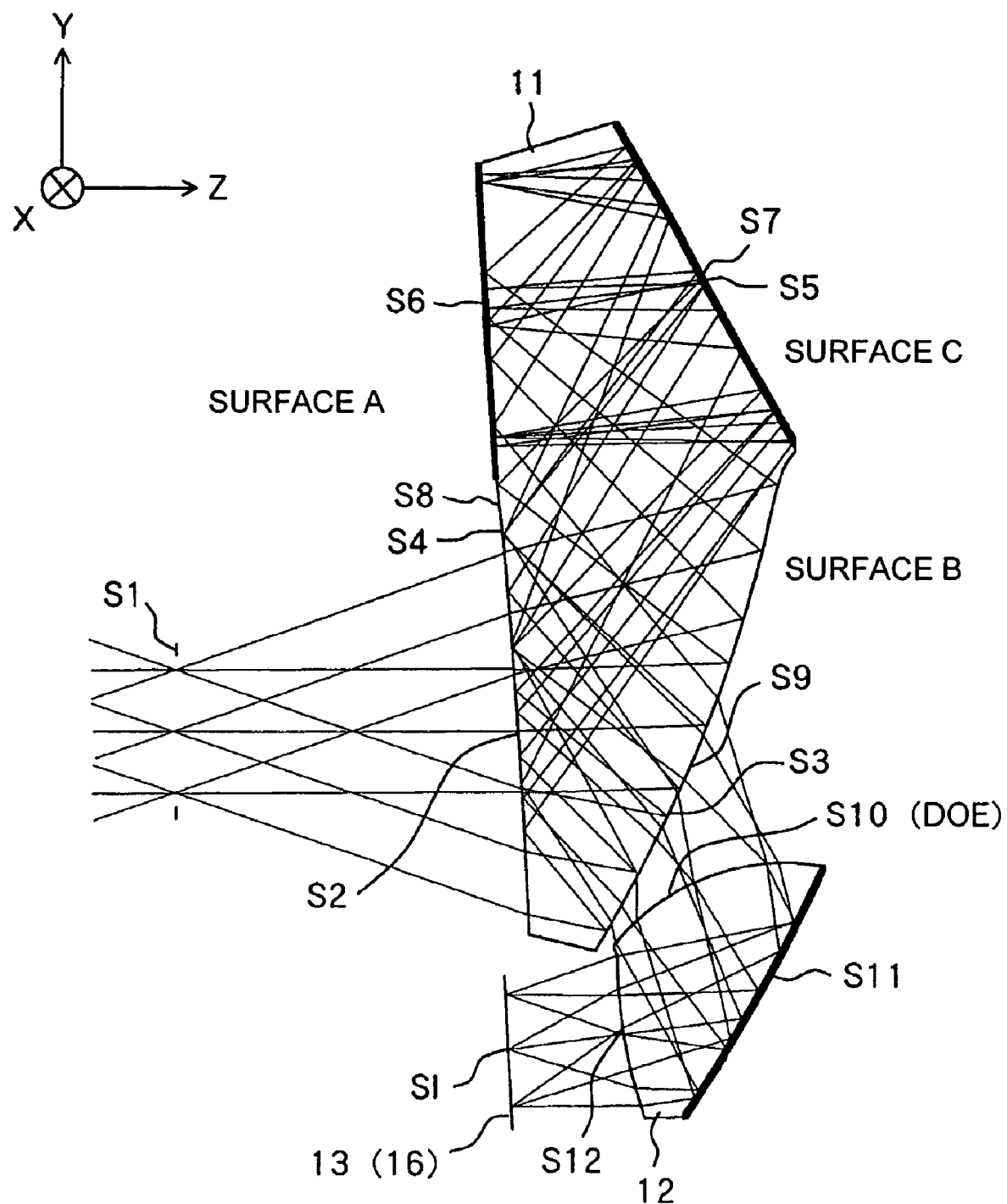
FIG. 6 shows a cross-sectional view of an optical system according to Numerical Example 2 of the present invention.

FIG. 6 is a cross-sectional view illustrating Numerical Example 2 of the present invention, and the optical data for this numerical example is shown in Table 2. This Numerical Example 2 corresponds to the above-described Embodiments 3 and 4. The optical element 11 is a prism-shaped transparent member, which is filled with an optical medium, and has three optical surfaces A to C, including a returning reflection surface (surface A).

S2, S4, S6 and S8 denote the same surface (surface A), and also S3 and S9 denote the same surface (surface B). Also S5 and S7 denote the same surface (surface C). S6 is the returning reflection surface, which has a returning reflection action.

The optical element 12 constituting the second optical system is made of a prism-shaped transparent member, which is filled with an optical medium, and has three optical surfaces S10, S11 and S12, including a diffractive optical surface (DOE surface) S10.

All these surfaces are plane symmetric having the paper plane (yz-section) of the figure as their only symmetry plane.

If this optical system is used for a display optical system, then, taking SI as the display surface of the original image of the image forming device 13, the light from SI enters the optical element 12 through S12, is reflected at the surface S11, emerges from the optical element 12 through S10, and travels toward the optical element 11.

The light traveling toward the optical element 11 enters the optical element 11 through S9, is reflected at S8, reflected at S7, then reflected at S6 (returning reflection surface), reflected at S5, reflected at S4, reflected at S3, emerges from the optical element 11 through S2, and is guided to the exit pupil S1. The reflection at the surface C and at S11, as well as the reflection that is not an internal total reflection at the surface A are reflections due to a reflective film. Furthermore, a half-transmissive-reflective film (half-mirror) is formed on the surface B.

By placing a DOE surface (S10) near the pupil image-forming position, it is possible to efficiently suppress axial chromatic aberration. Moreover, as in Numerical Example 1, also in Numerical Example 2, an intermediate image is formed inside the optical element 11.

When the unit of length for the numerical values in Numerical Example 2 is taken to be mm, a display optical system is attained with which an image is displayed at infinity in the z-axis direction with an exit pupil diameter of φ10 mm, an image size of about 10 mm×7.5 mm, and a horizontal field angle of 50°.

Moreover, like the optical system of Numerical Example 1, the optical system of this numerical example can be used for an image-taking optical system in which SI serves as the light-receiving surface of the image-pickup device 16.

NUMERICAL EXAMPLE 3

Figure 7:
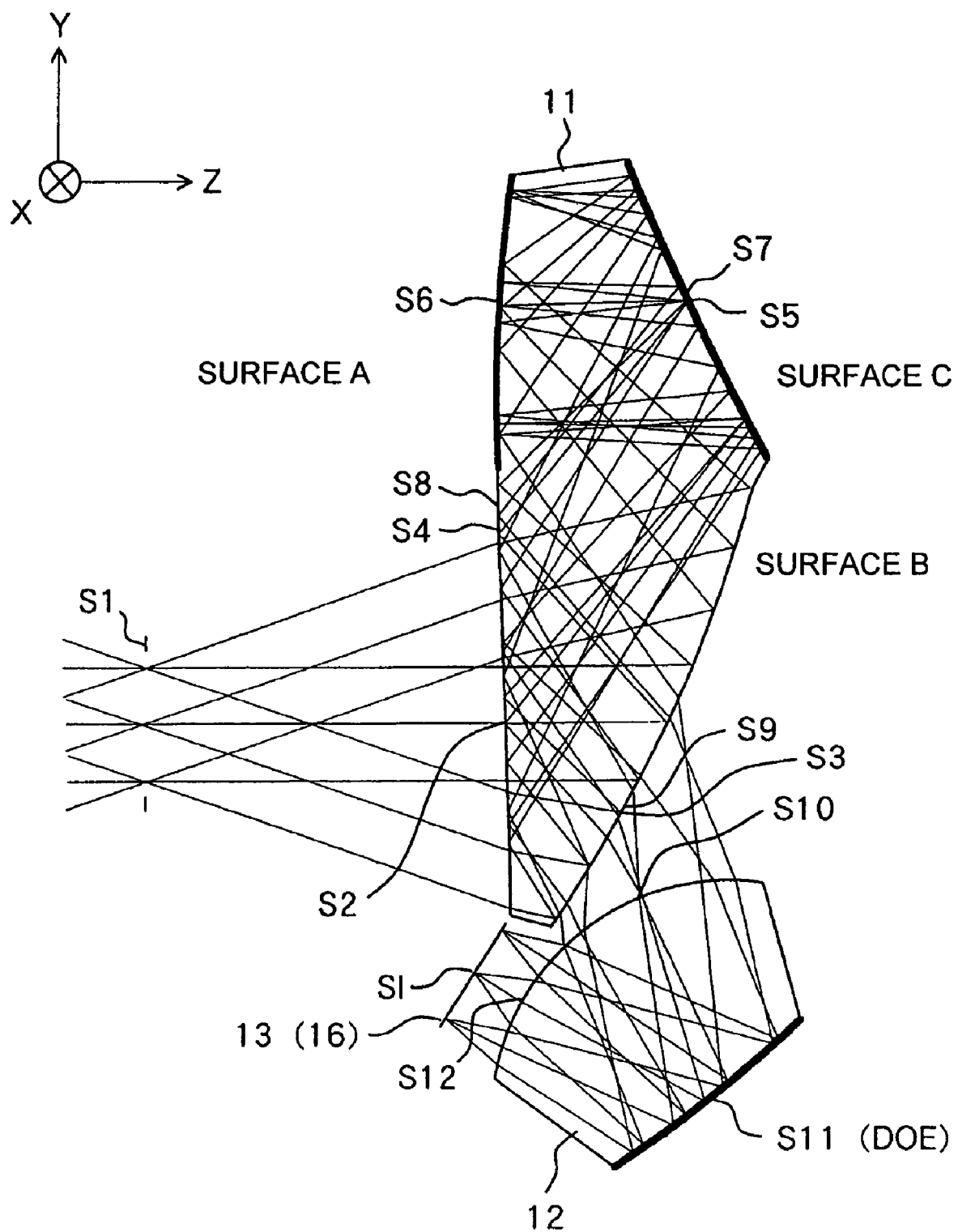
FIG. 7 shows a cross-sectional view of an optical system according to Numerical Example 3 of the present invention.

FIG. 7 is a cross-sectional view illustrating Numerical Example 3 of the present invention, and the optical data for this numerical example is shown in Table 3. This Numerical Example 3 corresponds to the above-described Embodiments 3 and 4. The optical element 11 is a prism-shaped transparent member, which is filled with an optical medium, and has three optical surfaces A to C, including a returning reflection surface (surface A).

S2, S4, S6 and S8 denote the same surface (surface A), and also S3 and S9 denote the same surface (surface B) Also S5 and S7 denote the same surface (surface C). S6 is the returning reflection surface, which has a returning reflection action.

The optical element 12 constituting the second optical system is made of a prism-shaped transparent member, which is filled with an optical medium, and has three optical surfaces S10, S11 and S12, including a diffractive optical surface (DOE surface) S11.

All these surfaces are plane symmetric having the paper plane (yz-section) of the figure as their only symmetry plane.

If this optical system is used for a display optical system, then, taking SI as the display surface of the original image of the image forming device 13, the light from SI enters the optical element 12 through S12, is reflected at the surface S11, emerges from the optical element 12 through S10, and travels toward the optical element 11. The light traveling toward the optical element 11 enters the optical element 11 through S9, is reflected at S8, reflected at S7, then reflected at S6 (returning reflection surface), reflected at S5, reflected at S4, reflected at S3, emerges from the optical element 11 through S2, and is guided to the exit pupil S1.

The reflection at the surface C and at S11, as well as the reflection that is not an internal total reflection at the surface A are reflections due to a reflective film. Furthermore, a half-transmissive-reflective film (half-mirror) is formed on the surface B.

By making the DOE surface (S11) a reflective surface, it is possible to efficiently suppress aberrations and to attain a superior optical performance. Moreover, like in Numerical Example 1, also in Numerical Example 3, an intermediate image is formed inside the optical element 11.

When the unit of length for the numerical values in Numerical Example 3 is taken to be mm, a display optical system is attained with which an image is displayed at infinity in the z-axis direction with an exit pupil diameter of φ10 mm, an image size of about 10 mm×7.5 mm, and a horizontal field angle of 50°.

Moreover, like the optical system of Numerical Example 1, the optical system of this numerical example can be used for an image-taking optical system in which SI serves as the light-receiving surface of the image-pickup device 16.

NUMERICAL EXAMPLE 4

Figure 8:
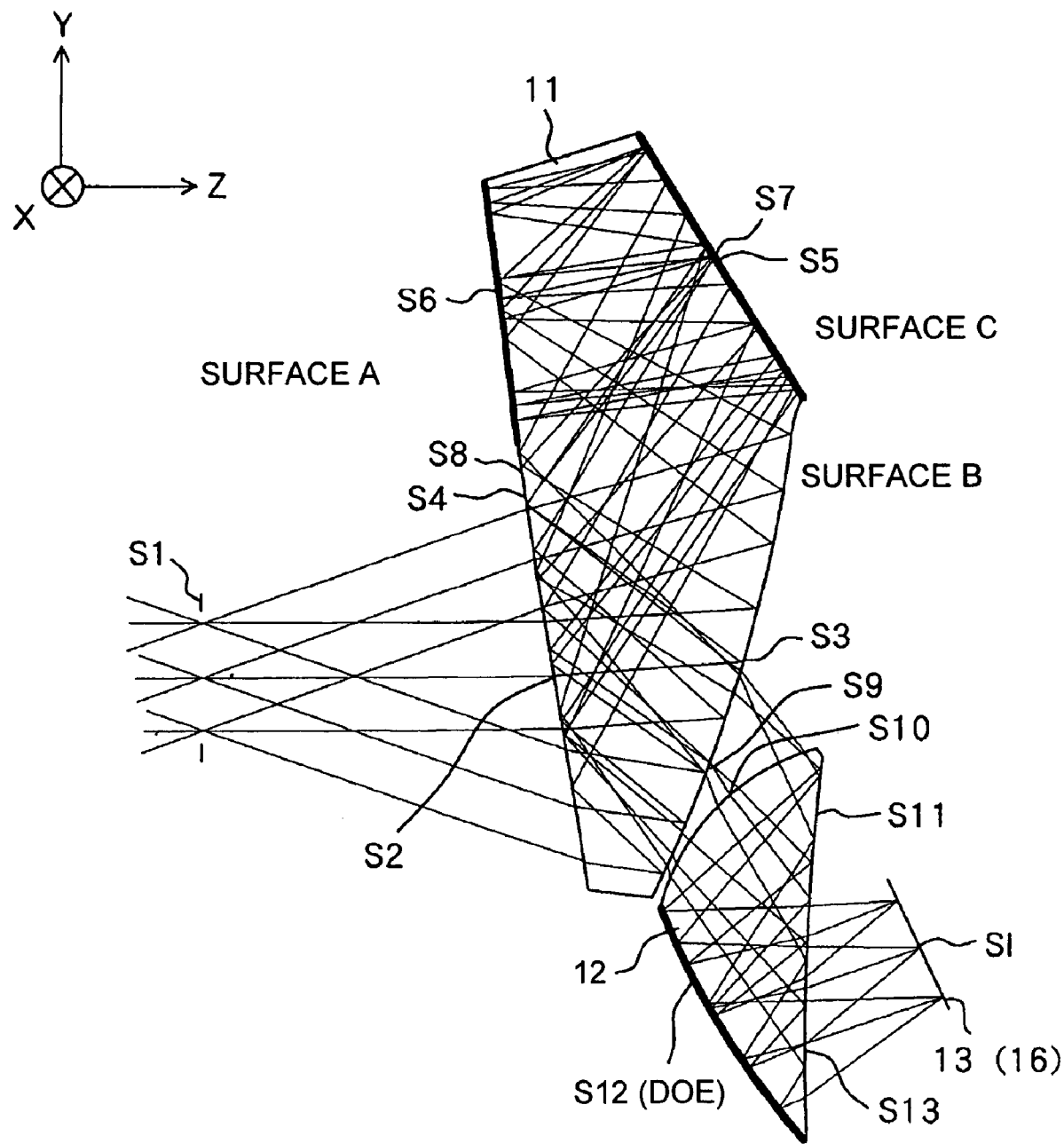
FIG. 8 shows a cross-sectional view of an optical system according to Numerical Example 4 of the present invention.

FIG. 8 is a cross-sectional view illustrating Numerical Example 4 of the present invention, and the optical data for this numerical example is shown in Table 4. This Numerical Example 4 corresponds to the above-described Embodiments 3 and 4. The optical element 11 is a prism-shaped transparent member, which is filled with an optical medium, and has three optical surfaces A to C, including a returning reflection surface (surface A).

S2, S4, S6 and S8 denote the same surface (surface A), and also S3 and S9 denote the same surface (surface B) Also S5 and S7 denote the same surface (surface C). S6 is the returning reflection surface, which has a returning reflection action.

The optical element 12 constituting the second optical system is made of a prism-shaped transparent member, which is filled with an optical medium, and has three optical surfaces S10, S11 (on the same surface as S13) and S12, including a diffractive optical surface (DOE surface) S12.

All these surfaces are plane symmetric having the paper plane (yz-section) of the figure as their only symmetry plane.

If this optical system is used for a display optical system, then, taking SI as the display surface of the original image of the image forming device 13, the light from SI enters the optical element 12 through S13, is reflected at S12, reflected at S11, emerges from the optical element 12 through S10, and travels toward the optical element 11.

The light traveling toward the optical element 11 enters the optical element 11 through S9, is reflected at S8, reflected at S7, then reflected at S6 (returning reflection surface), reflected at S5, reflected at S4, reflected at S3, emerges from the optical element 11 through S2, and is guided to the exit pupil S1. The reflection at the surface C and at S11, as well as the reflection that is not an internal total reflection at the surface A are reflections due to a reflective film. Furthermore, a half-transmissive-reflective film (half-mirror) is formed on the surface B.

By making the DOE surface (S12) a reflective surface, it is possible to efficiently suppress aberrations and to attain a superior optical performance.

Moreover, like in Numerical Example 1, also in Numerical Example 4, an intermediate image is formed inside the optical element 11.

When the unit of length for the numerical values in Numerical Example 4 is taken to be mm, a display optical system is attained with which an image is displayed at infinity in the z-axis direction with an exit pupil diameter of φ10 mm, an image size of about 10 mm×7.5 mm, and a horizontal field angle of 50°.

Moreover, like the optical system of Numerical Example 1, the optical system of this numerical example can be used for an image-taking optical system in which SI serves as the light-receiving surface of the image-pickup device 16.

NUMERICAL EXAMPLE 5

Figure 9:
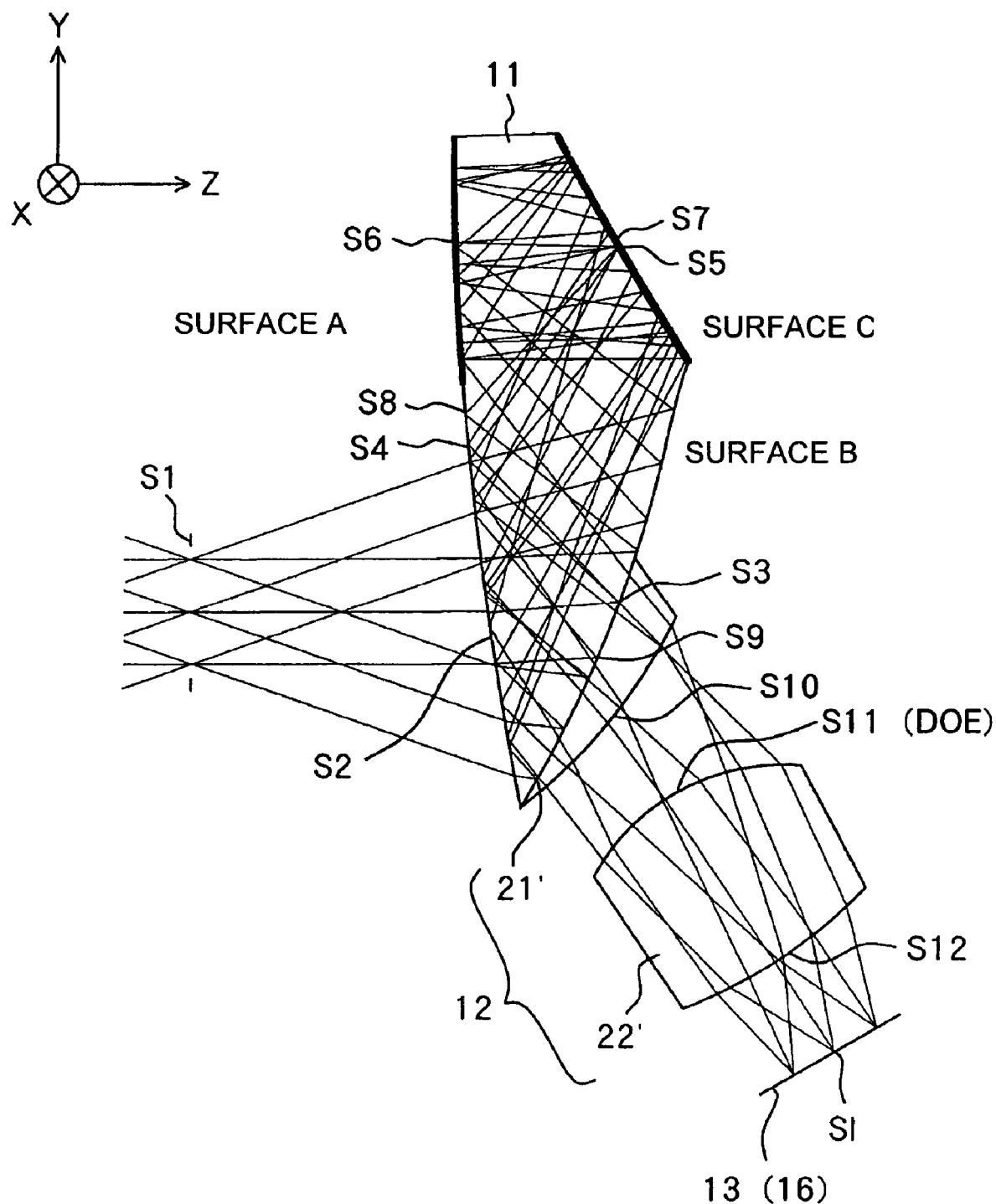
FIG. 9 shows a cross-sectional view of an optical system according to Numerical Example 5 of the present invention.

FIG. 9 is a cross-sectional view illustrating Numerical Example 5 of the present invention, and the optical data for this numerical example is shown in Table 5. This Numerical Example 5 corresponds to the above-described Embodiments 3 and 4. The optical element 11 is a prism-shaped transparent member, which is filled with an optical medium, and has three optical surfaces A to C, including a returning reflection surface (surface A).

S2, S4, S6 and S8 denote the same surface (surface A), and also S3 and S9 denote the same surface (surface B). Also S5 and S7 denote the same surface (surface C). S6 is the returning reflection surface, which has a returning reflection action.

The second optical system 12 is made of an optical element 21' and an optical element 22', which are prism-shaped transparent members, which are filled with an optical medium. The optical element 21' has the two surfaces S9 and S10 (in this numerical example, the surface B of the optical element 11 is cemented to the optical element 21', so that the surface S9 of the optical element 21' coincides with S9 of the optical element 11), and the optical element 22' has the two surfaces S11 (DOE surface) and S12.

All these surfaces are plane symmetric having the paper plane (yz-section) of the figure as their only symmetry plane.

If this optical system is used for a display optical system, then, taking SI as the display surface of the original image of the image forming device 13, the light from SI enters the optical element 22' through S12, and emerges from it through S11. Since the optical element 21' and the optical element 11 are cemented together at the surface S9, the light that has entered the optical element 21' at S10 enters the optical element 11 through S9.

The light that has entered the optical element 11 is reflected at S8, reflected at S7, then reflected at S6 (returning reflection surface), reflected at S5, reflected at S4, reflected at S3, emerges from the optical element 11 through S2, and is guided to the exit pupil S1.

The reflection at the surface C and the reflection that is not an internal total reflection at the surface A are reflections due to a reflective film.

Furthermore, a half-transmissive-reflective film (half-mirror) is formed on the surface B.

By making the DOE surface (S11) a transmissive surface, it is possible to make the grooves of the diffraction grating deeper, and to increase the dimensional tolerances, which makes manufacturing easier.

Moreover, like in Numerical Example 1, also in Numerical Example 5, an intermediate image is formed inside the optical element 11.

When the unit of length for the numerical values in Numerical Example 5 is taken to be mm, a display optical system is attained with which an image is displayed at infinity in the z-axis direction with an exit pupil diameter of φ10 mm, an image size of about 10 mm×7.5 mm, and a horizontal field angle of 50°.

Moreover, like the optical system of Numerical Example 1, also this embodiment can be used as an optical system for an image-taking apparatus.

NUMERICAL EXAMPLE 6

Figure 10:
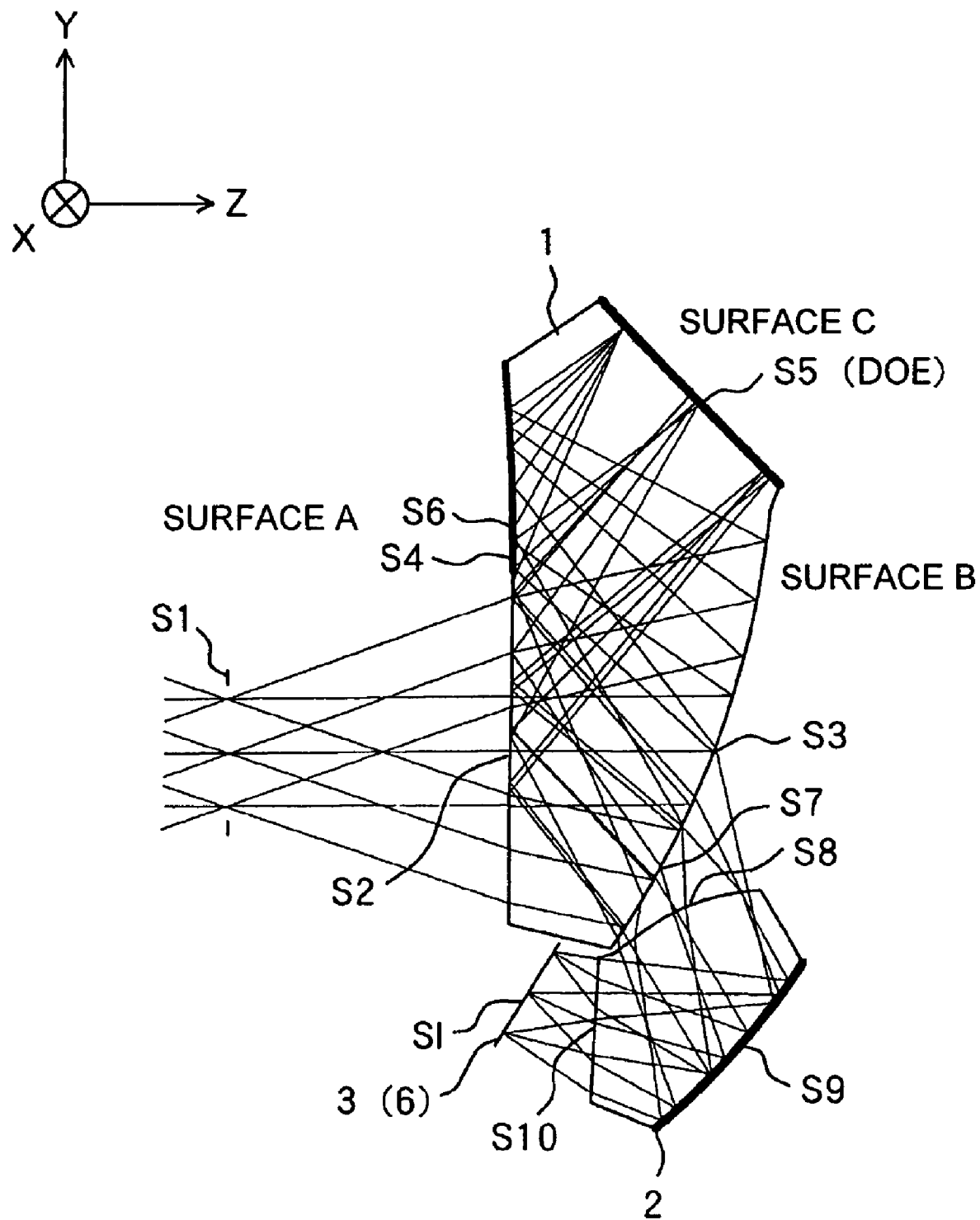
FIG. 10 shows a cross-sectional view of an optical system according to Numerical Example 6 of the present invention.

FIG. 10 is a cross-sectional view illustrating Numerical Example 6 of the present invention, and the optical data for this numerical example is shown in Table 6. This Numerical Example 6 corresponds to the above-described Embodiments 1 and 2. The optical element 1 is a prism-shaped transparent member, which is filled with an optical medium, and has three optical surfaces A to C, including a returning reflection surface and a diffractive optical surface (surface C).

S2, S4 and S6 denote the same surface (surface A), and S5 is the surface C. Also S3 and S7 denote the same surface (surface B). S5 is the returning reflection surface, which has a returning reflection action, and is also a diffractive optical surface (DOE surface).

The second optical system is made of an optical element 2 that is a prism-shaped transparent member, which is filled with an optical medium. The optical element 2 has the three optical surfaces S8, S9 and S10.

All these surfaces are plane symmetric having the paper plane (yz-section) of the figure as their only symmetry plane.

If this optical system is used for a display optical system, then, taking SI as the display surface of the original image of the image forming device 3, the light from SI enters the optical element 2 through S10, is reflected at S9, and emerges from the optical element 2 through S8, traveling toward the optical element 1.

The light that travels toward the optical element 1 enters the optical element 1 through S7, is reflected at S6, then reflected at S5 (returning reflection surface), reflected at S4, reflected at S3, emerges from the optical element 11 through S2, and is guided to the exit pupil S1.

The reflection at the surface C and at S9 as well as the reflection that is not an internal total reflection at the surface A are reflections due to a reflective film.

Furthermore, a half-transmissive-reflective film (half-mirror) is formed on the surface B.

By making the DOE surface (surface C) a reflective surface, it is possible to efficiently suppress aberrations and to attain a superior optical performance.

Moreover, like in Numerical Example 1, also in Numerical Example 6, an intermediate image is formed inside the optical element 1.

When the unit of length for the numerical values in Numerical Example 6 is taken to be mm, a display optical system is attained with which an image is displayed at infinity in the z-axis direction with an exit pupil diameter of φ10 mm, an image size of about 10 mm×7.5 mm, and a horizontal field angle of 50°.

Moreover, like the optical system of Numerical Example 1, the optical system of this numerical example can be used for an image-taking optical system in which SI serves as the light-receiving surface of the image-pickup device 6.

NUMERICAL EXAMPLE 7

Figure 11:
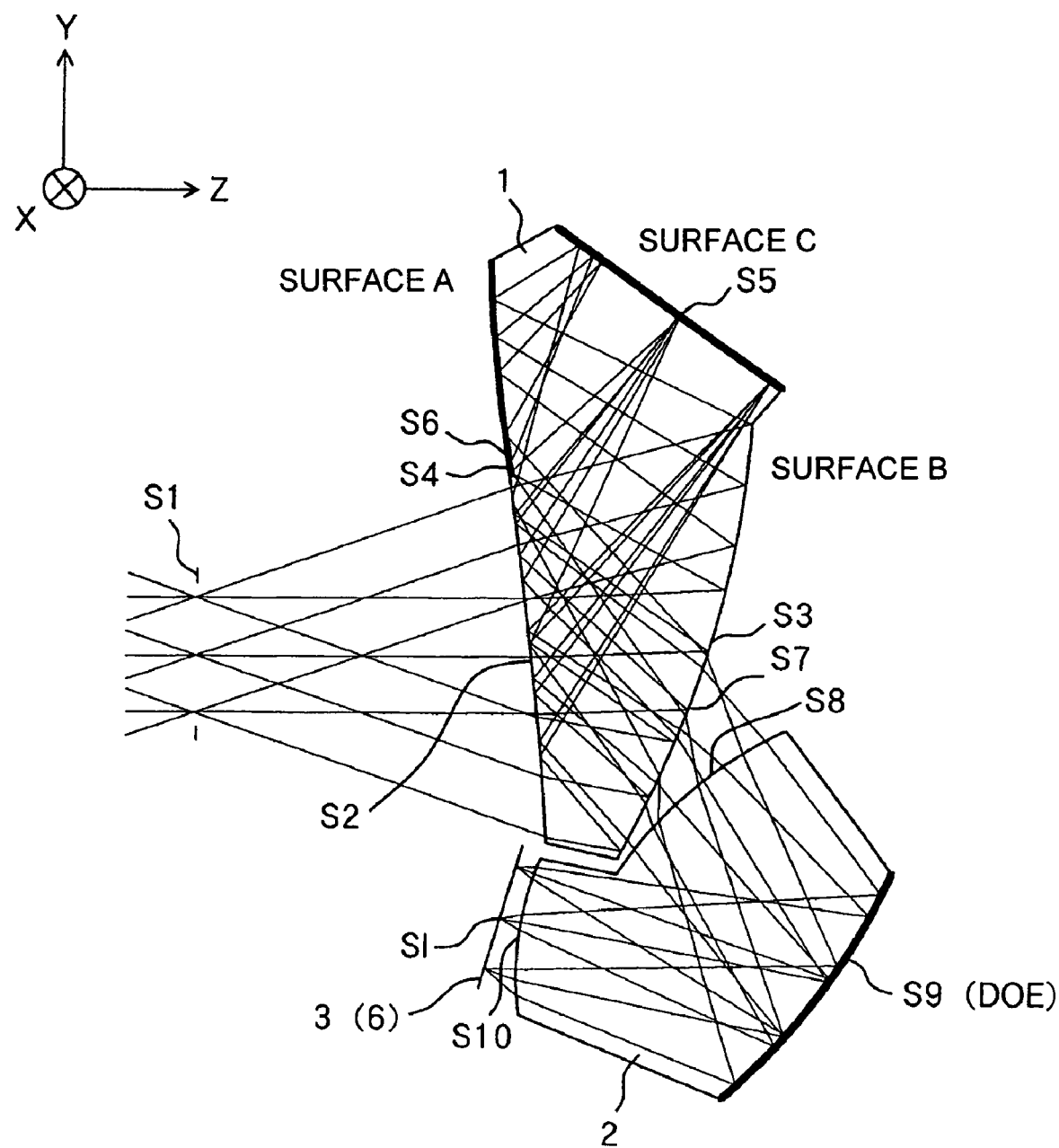
FIG. 11 shows a cross-sectional view of an optical system according to Numerical Example 7 of the present invention.

FIG. 11 is a cross-sectional view illustrating Numerical Example 7 of the present invention, and the optical data for this numerical example is shown in Table 7. This Numerical Example 7 corresponds to the above-described Embodiments 1 and 2. The optical element 1 is a prism-shaped transparent member, which is filled with an optical medium, and has three optical surfaces A to C, including a returning reflection surface (surface C).

S2, S4 and S6 denote the same surface (surface A), and S5 is the surface C. Also S3 and S7 denote the same surface (surface B). S5 is the returning reflection surface, which has a returning reflection action.

The second optical system is made of an optical element 2 that is a prism-shaped transparent member, which is filled with an optical medium. The optical element 2 has the three optical surfaces S8, S9 and S10, including a diffractive optical surface (DOE surface) S9.

All these surfaces are plane symmetric having the paper plane (yz-section) of the figure as their only symmetry plane.

If this optical system is used for a display optical system, then, taking SI as the display surface of the original image of the image forming device 3, the light from SI enters the optical element 2 through S10, is reflected at S9, and emerges from the optical element 2 through S8, traveling toward the optical element 1.

The light that travels toward the optical element 1 enters the optical element 1 through S7, is reflected at S6, then reflected at S5 (returning reflection surface), reflected at S4, reflected at S3, emerges from the optical element 1 through S2, and is guided to the exit pupil S1.

The reflection at the surface C and at S9 as well as the reflection that is not an internal total reflection at the surface A are reflections due to a reflective film.

Furthermore, a half-transmissive-reflective film (half-mirror) is formed on the surface B.

By placing a DOE surface (S9) near the pupil image-forming position, it is possible not only to efficiently suppress axial chromatic aberration, but also to attain superior optical performance with various corrected aberrations.

Moreover, as in Numerical Example 1, also in Numerical Example 7, an intermediate image is formed inside the optical element 1.

When the unit of length for the numerical values in Numerical Example 7 is taken to be mm, a display optical system is attained with which an image is displayed at infinity in the z-axis direction with an exit pupil diameter of φ10 mm, an image size of about 10 mm×7.5 mm, and a horizontal field angle of 50°.

Moreover, like the optical system of Numerical Example 1, the optical system of this numerical example can be used for an image-taking optical system in which SI serves as the light-receiving surface of the image-pickup device 6.

NUMERICAL EXAMPLE 8

Figure 12:
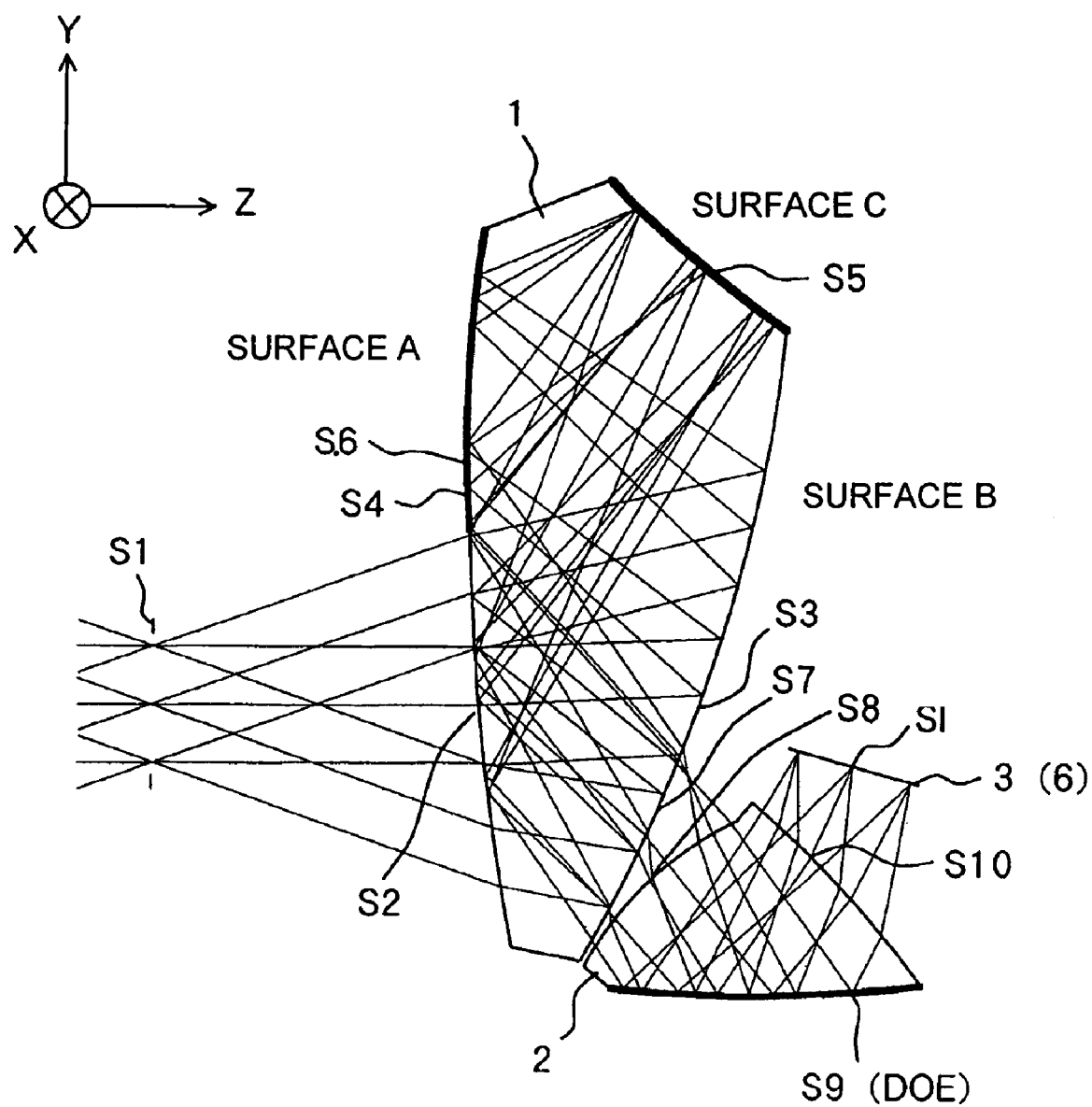
FIG. 12 shows a cross-sectional view of an optical system according to Numerical Example 8 of the present invention.

FIG. 12 is a cross-sectional view illustrating Numerical Example 8 of the present invention, and the optical data for this numerical example is shown in Table 8. This Numerical Example 8 corresponds to the above-described Embodiments 1 and 2. The optical element 1 is a prism-shaped transparent member, which is filled with an optical medium, and has three optical surfaces A to C, including a returning reflection surface (surface C).

S2, S4 and S6 denote the same surface (surface A), and S5 is the surface C. Also S3 and S7 denote the same surface (surface B). S5 is the returning reflection surface, which has a returning reflection action.

The second optical system is made of an optical element 2 that is a prism-shaped transparent member, which is filled with an optical medium. The optical element 2 has the three optical surfaces S8, S9 and S10, including a diffractive optical surface (DOE surface) S9.

All these surfaces are plane symmetric having the paper plane (yz-section) of the figure as their only symmetry plane.

If this optical system is used for a display optical system, then, taking SI as the display surface of the original image of the image forming device 3, the light from SI enters the optical element 2 through S10, is reflected at S9, and emerges from the optical element 2 through S8, traveling toward the optical element 1.

The light that travels toward the optical element 1 enters the optical element 1 through S7, is reflected at S6, then reflected at S5 (returning reflection surface), reflected at S4, reflected at S3, emerges from the optical element 1 through S2, and is guided to the exit pupil S1.

The reflection at the surface C and at S9 as well as the reflection that is not an internal total reflection at the surface A are reflections due to a reflective film.

Furthermore, a half-transmissive-reflective film (half-mirror) is formed on the surface B.

By making the DOE surface (S9) a reflective surface, aberrations are corrected efficiently, and a favorable optical performance can be attained.

Moreover, as in Numerical Example 1, also in Numerical Example 8, an intermediate image is formed inside the optical element 1.

When the unit of length for the numerical values in Numerical Example 8 is taken to be mm, a display optical system is attained with which an image is displayed at infinity in the z-axis direction with an exit pupil diameter of φ10 mm, an image size of about 10 mm×7.5 mm, and a horizontal field angle of 50°.

Moreover, like the optical system of Numerical Example 1, the optical system of this numerical example can be used for an image-taking optical system in which SI serves as the light-receiving surface of the image-pickup device 6.

NUMERICAL EXAMPLE 9

Figure 13:
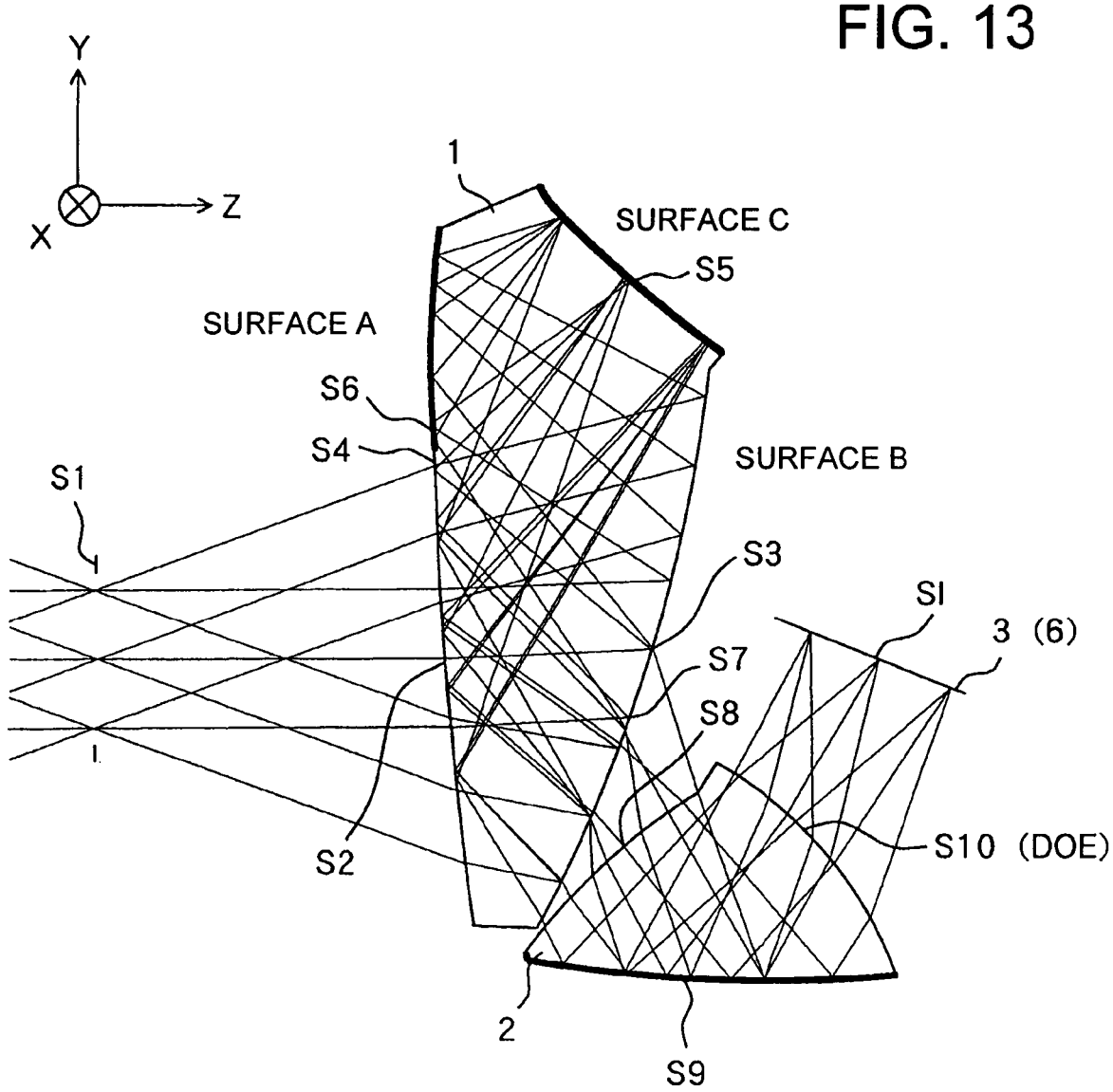
FIG. 13 shows a cross-sectional view of an optical system according to Numerical Example 9 of the present invention.

FIG. 13 is a cross-sectional view illustrating Numerical Example 9 of the present invention, and the optical data for this numerical example is shown in Table 9. This Numerical Example 9 corresponds to the above-described Embodiments 1 and 2. The optical element 1 is a prism-shaped transparent member, which is filled with an optical medium, and has three optical surfaces A to C, including a returning reflection surface (surface C).

S2, S4 and S6 denote the same surface (surface A), and S5 is the surface C. Also S3 and S7 denote the same surface (surface B). S5 is the returning reflection surface, which has a returning reflection action.

The second optical system is made of an optical element 2 that is a prism-shaped transparent member, which is filled with an optical medium. The optical element 2 has the three optical surfaces S8, S9 and S10, including a diffractive optical surface (DOE surface) S10.

All these surfaces are plane symmetric having the paper plane (yz-section) of the figure as their only symmetry plane.

If this optical system is used for a display optical system, then, taking SI as the display surface of the original image of the image forming device 3, the light from SI enters the optical element 2 through S10, is reflected at S9, and emerges from the optical element 2 through S8, traveling toward the optical element 1.

The light that travels toward the optical element 1 enters the optical element 1 through S7, is reflected at S6, then reflected at S5 (returning reflection surface), reflected at S4, reflected at S3, emerges from the optical element 1 through S2, and is guided to the exit pupil S1. The reflection at the surface C and at S9 as well as the reflection that is not an internal total reflection at the surface A are reflections due to a reflective film.

Furthermore, a half-transmissive-reflective film (half-mirror) is formed on the surface B.

By making the DOE surface (S10) a transmissive surface, it is possible to make the grooves of the diffraction grating deeper, and to increase the dimensional tolerances, which makes manufacturing easier. Moreover, as in Numerical Example 1, also in Numerical Example 9, an intermediate image is formed inside the optical element 1.

When the unit of length for the numerical values in Numerical Example 9 is taken to be mm, a display optical system is attained with which an image is displayed at infinity in the z-axis direction with an exit pupil diameter of φ10 mm, an image size of about 12 mm×9 mm, and a horizontal field angle of 50°.

Moreover, like the optical system of Numerical Example 1, the optical system of this numerical example can be used for an image-taking optical system in which SI serves as the light-receiving surface of the image-pickup device 6.

NUMERICAL EXAMPLE 10

Figure 14:
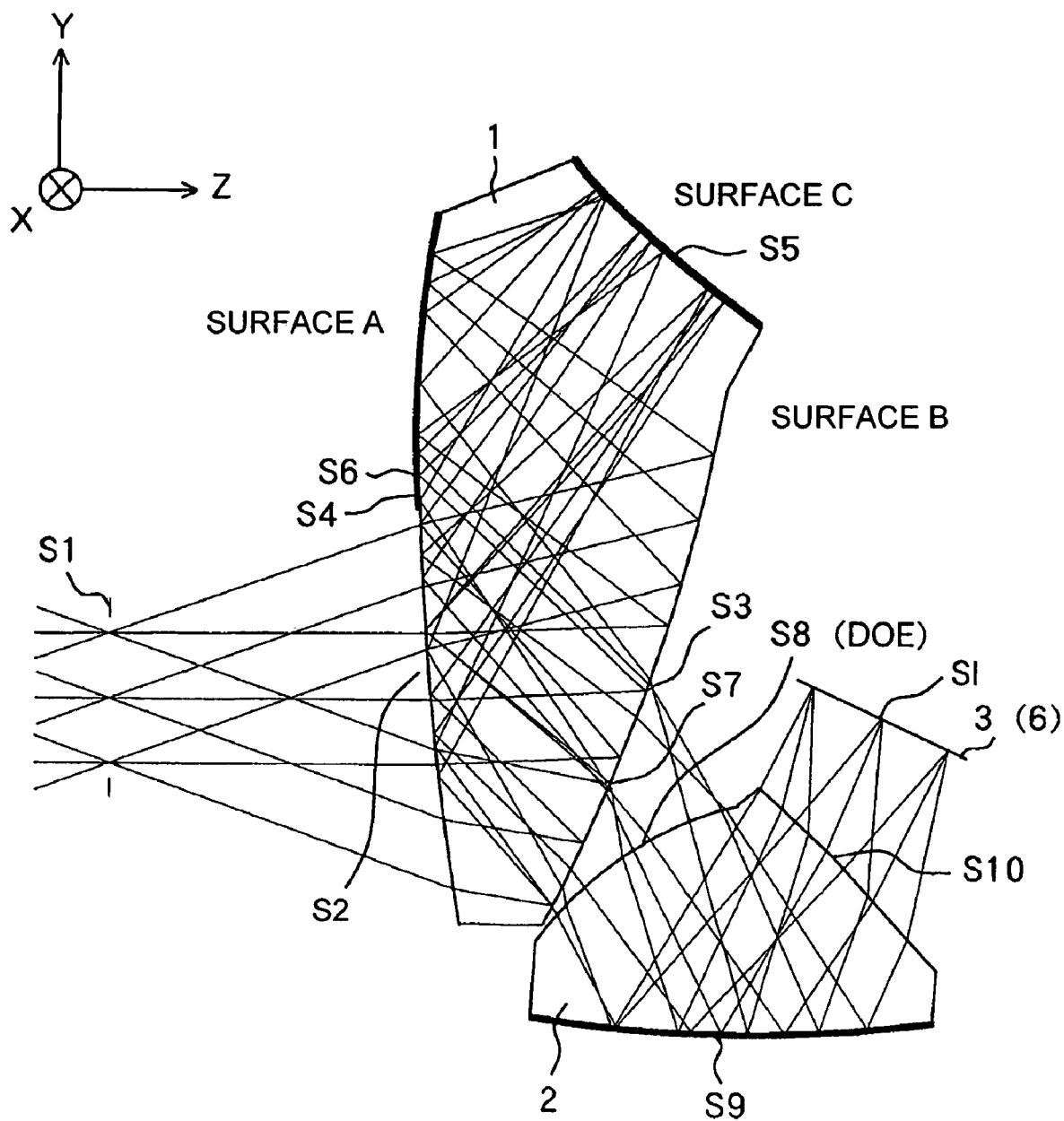
FIG. 14 shows a cross-sectional view of an optical system according to Numerical Example 10 of the present invention.

FIG. 14 is a cross-sectional view illustrating Numerical Example 10 of the present invention, and the optical data for this numerical example is shown in Table 10. This Numerical Example 10 corresponds to the above-described Embodiments 1 and 2. The optical element 1 is a prism-shaped transparent member, which is filled with an optical medium, and has three optical surfaces A to C, including a returning reflection surface (surface C).

S2, S4 and S6 denote the same surface (surface A), and S5 is the surface C. Also S3 and S7 denote the same surface (surface B). S5 is the returning reflection surface, which has a returning reflection action.

The second optical system is made of an optical element 2 that is a prism-shaped transparent member, which is filled with an optical medium. The optical element 2 has the three optical surfaces S8, S9 and S10, including a diffractive optical surface (DOE surface) S8.

All these surfaces are plane symmetric having the paper plane (yz-section) of the figure as their only symmetry plane.

If this optical system is used for a display optical system, then, taking SI as the display surface of the original image of the image forming device 3, the light from SI enters the optical element 2 through S10, is reflected at S9, and emerges from the optical element 2 through S8, traveling toward the optical element 1. The light that travels toward the optical element 1 enters the optical element 1 through S7, is reflected at S6, then reflected at S5 (returning reflection surface), reflected at S4, reflected at S3, emerges from the optical element 1 through S2, and is guided to the exit pupil S1.

The reflection at the surface C and at S9 as well as the reflection that is not an internal total reflection at the surface A are reflections due to a reflective film.

Furthermore, a half-transmissive-reflective film (half-mirror) is formed on the surface B.

By making the DOE surface (S8) a transmissive surface, it is possible to make the grooves of the diffraction grating deeper, and to increase the dimensional tolerances, which makes manufacturing easier.

Moreover, as in Numerical Example 1, also in Numerical Example 10, an intermediate image is formed inside the optical element 1.

When the unit of length for the numerical values in Numerical Example 10 is taken to be mm, a display optical system is attained with which an image is displayed at infinity in the z-axis direction with an exit pupil diameter of φ10 mm, an image size of about 12 mm×9 mm, and a horizontal field angle of 50°.

Moreover, like the optical system of Numerical Example 1, the optical system of this numerical example can be used for an image-taking optical system in which SI serves as the light-receiving surface of the image-pickup device 6.

NUMERICAL EXAMPLE 11

Figure 15:
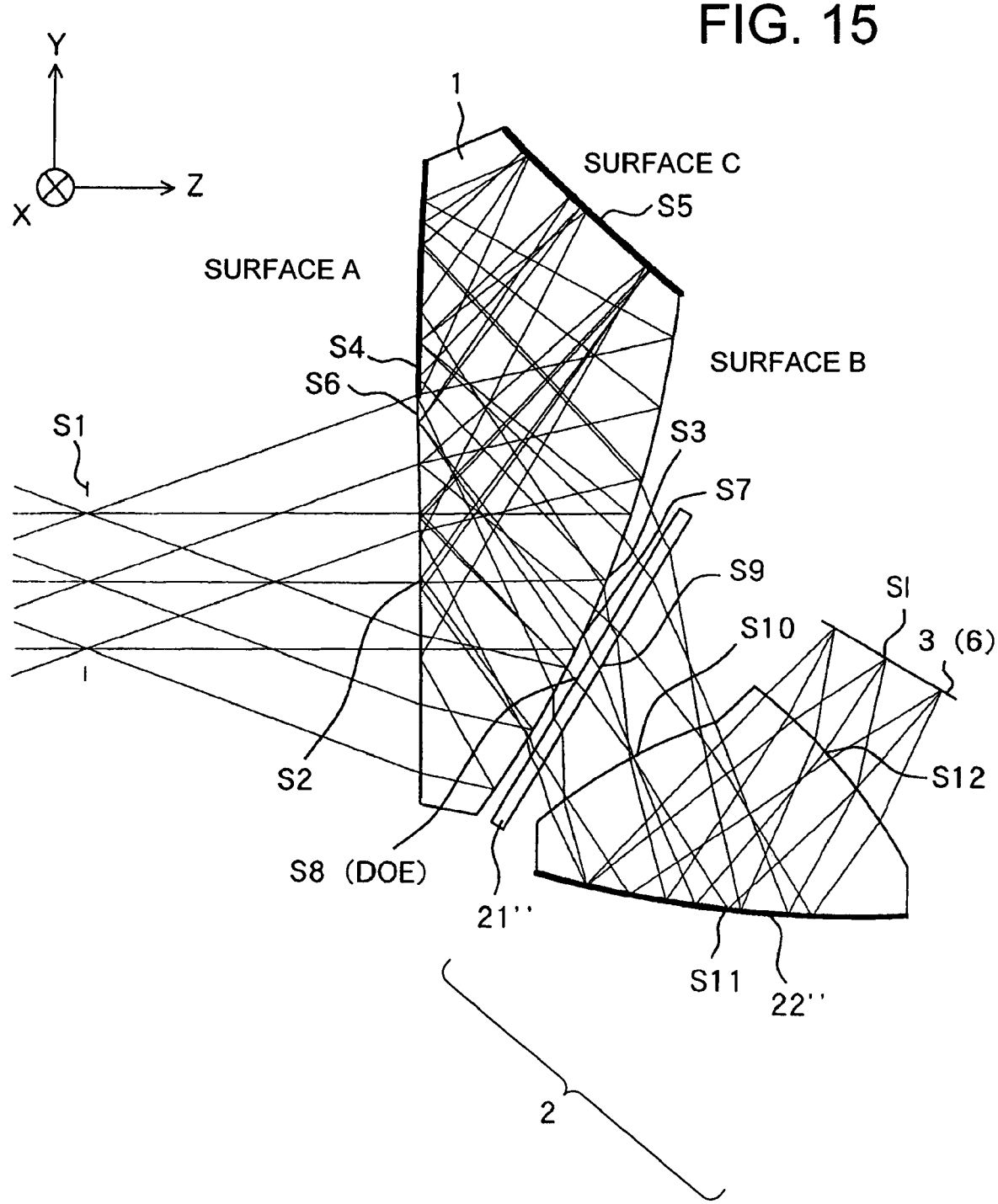
FIG. 15 shows a cross-sectional view of an optical system according to Numerical Example 11 of the present invention.

FIG. 15 is a cross-sectional view illustrating Numerical Example 11 of the present invention, and the optical data for this numerical example is shown in Table 11. This Numerical Example 11 corresponds to the above-described Embodiments 1 and 2. The optical element 1 is a prism-shaped transparent member, which is filled with an optical medium, and has three optical surfaces A to C, including a returning reflection surface (surface C).

S2, S4 and S6 denote the same surface (surface A), and S5 is the surface C. Also S3 and S7 denote the same surface (surface B). S5 is the returning reflection surface, which has a returning reflection action.

The second optical system 2 is made of an optical element 21," which is a flat plate-shaped transparent member filled with an optical medium, and an optical element 22," which is a prism-shaped transparent member also filled with an optical medium.

The optical element 21" has a surface S8, which is a diffractive optical surface (DOE surface), and a surface S9. The optical element 22" has the three optical surfaces S10, S11 and S12. The phase distribution of the DOE surface S8 is rotationally symmetric.

If this optical system is used for a display optical system, then, taking SI as the display surface of the original image of the image forming device 3, the light from SI enters the optical element 22" through S12, is reflected at S11, and emerges from the optical element 22" through S10, enters the optical element 21" through S9, and emerges from it through S8, traveling toward the optical element 1.

The light that travels toward the optical element 1 enters the optical element 1 through S7, is reflected at S6, then reflected at S5 (returning reflection surface), reflected at S4, reflected at S3, emerges from the optical element 1 through S2, and is guided to the exit pupil S1.

The reflection at the surface C and at S11 as well as the reflection that is not an internal total reflection at the surface A are reflections due to a reflective film.

Furthermore, a half-transmissive-reflective film (half-mirror) is formed on the surface B.

By making the base surface of the DOE surface (S8) planar, it becomes easier to manufacture, and by making the phase distribution of the DOE surface (S8) rotationally symmetric, the machining precision can be increased.

Moreover, as in Numerical Example 1, also in this Numerical Example 11, an intermediate image is formed inside the optical element 1.

When the unit of length for the numerical values in Numerical Example 11 is taken to be mm, a display optical system is attained with which an image is displayed at infinity in the z-axis direction with an exit pupil diameter of φ10 mm, an image size of about 10 mm×7.5 mm, and a horizontal field angle of 50°.

Moreover; like the optical system of Numerical Example 1, the optical system of this numerical example can be used for an image-taking optical system in which SI serves as the light-receiving surface of the image-pickup device 6.

NUMERICAL EXAMPLE 12

Figure 16:
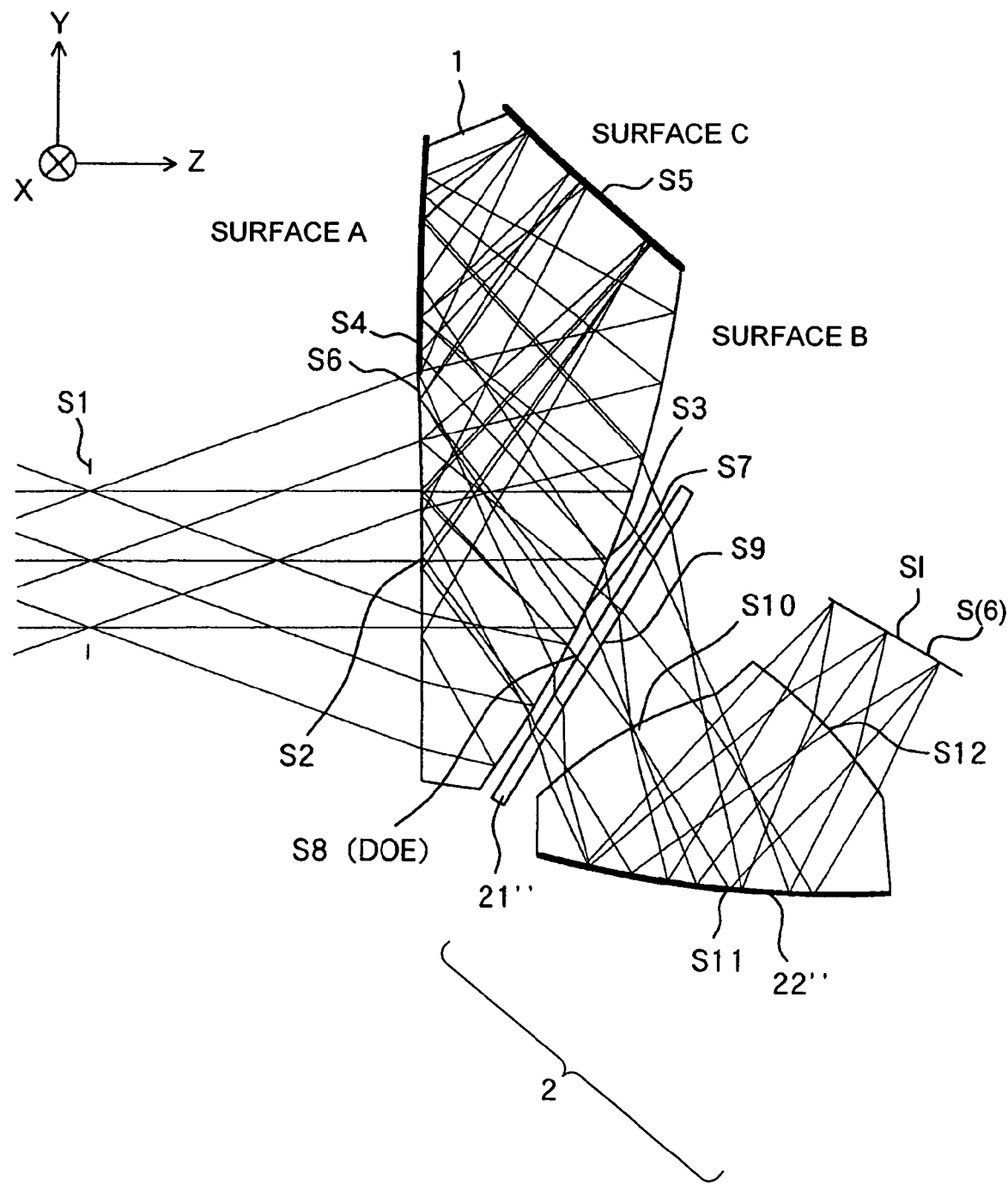
FIG. 16 shows a cross-sectional view of an optical system according to Numerical Example 12 of the present invention.
Figure 17:
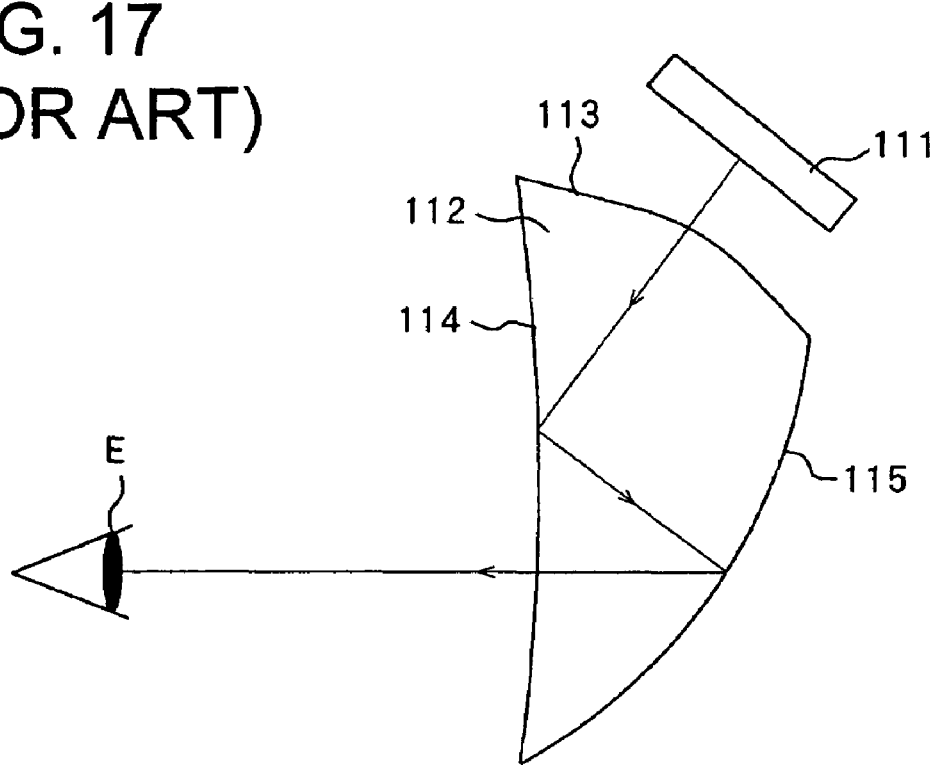
FIG. 17 is a diagrammatic view of a conventional display optical system.
Figure 18:
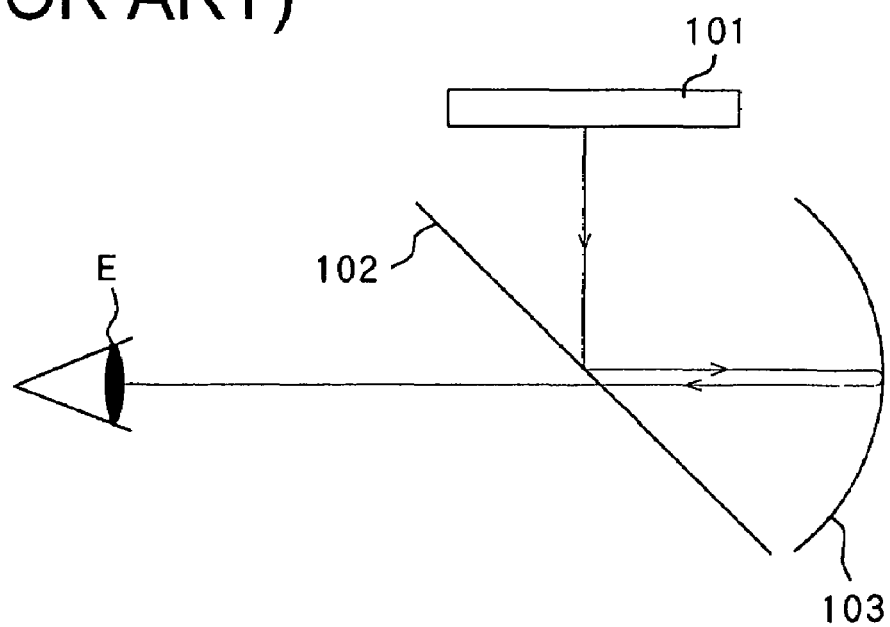
FIG. 18 is a diagrammatic view of a conventional display optical system.

FIG. 16 is a cross-sectional view illustrating Numerical Example 12 of the present invention, and the optical data for this numerical example is shown in Table 12. This Numerical Example 12 corresponds to the above-described Embodiments 1 and 2. The optical element 1 is a prism-shaped transparent member, which is filled with an optical medium, and has three optical surfaces A to C, including a returning reflection surface (surface C).

S2, S4 and S6 denote the same surface (surface A), and S5 is the surface C. Also S3 and S7 denote the same surface (surface B). S5 is the returning reflection surface, which has a returning reflection action. The second optical system 2 is made of an optical element 21" which is a flat plate-shaped transparent member filled with an optical medium, and an optical element 22" which is a prism-shaped transparent member, also filled with an optical medium.

The optical element 21" has the surface S8, which is a diffractive optical surface (DOE surface), and the surface S9. The optical element 22" has the three optical surfaces S10, S11 and S12. The phase distribution of the DOE surface S8 is rotationally asymmetric.

If this optical system is used for a display optical system, then, taking SI as the display surface of the original image of the image forming device 3, the light from SI enters the optical element 22" through S12, is reflected at S11, and emerges from the optical element 22" through S10, enters the optical element 21" through S9, and emerges from it through S8, traveling toward the optical element 1. The light that travels toward the optical element 1 enters the optical element 1 through S7, is reflected at S6, then reflected at S5 (returning reflection surface), reflected at S4, reflected at S3, emerges from the optical element 1 through S2, and is guided to the exit pupil S1.

The reflection at the surface C and at S11 as well as the reflection that is not an internal total reflection at the surface A are reflections due to a reflective film.

Furthermore, a half-transmissive-reflective film (half-mirror) is formed on the surface B.

By making the base surface of the DOE surface (S8) planar, it becomes easier to manufacture, and by making the phase distribution of the DOE surface (S8) rotationally asymmetric, the machining precision can be increased.

Moreover, as in Numerical Example 1, also in Numerical Example 12, an intermediate image is formed inside the optical element 1.

When the unit of length for the numerical values in Numerical Example 12 is taken to be mm, a display optical system is attained with which an image is displayed at infinity in the z-axis direction with an exit pupil diameter of φ10 mm, an image size of about 10 mm×7.5 mm, and a horizontal field angle of 50°.

Moreover, like the optical system of Numerical Example 1, the optical system of this numerical example can be used for an image-taking optical system in which SI serves as the light-receiving surface of the image-pickup device 6.

As describe above, with the foregoing embodiments, it is possible to ensure a long optical path length and achieve a broad field angle with a compact optical system. And what is more, it is possible to suppress the occurrence of chromatic and decentration aberration.

Moreover, arranging the diffractive optical surface on the second surface contributes to an efficient correction of aberrations, in particular a correction of chromatic aberration, and makes it possible to achieve a superior optical performance.

Moreover, by arranging the diffractive optical surface on a surface other than the first and the second surface, it is possible to correct the decentration aberration occurring in the optical system and to achieve an even superior optical performance.

Moreover, by making the diffractive optical surface a rotationally symmetric or rotationally asymmetric curved surface and providing a phase distribution on the curved surface, it is possible to provide the diffractive optical surface with optical power, so that it becomes possible to eliminate unnecessary surfaces, and to attain further miniaturization. In particular by providing a phase distribution on a rotationally asymmetric curved surface, it is possible to increase the degree of freedom for the optical power of the diffractive optical surfaces, and to suitably suppress aberrations.

Moreover, making this phase distribution rotationally symmetric reduces manufacturing difficulties and facilitates manufacturing.

Moreover, making this phase distribution rotationally asymmetric, it becomes possible to form a diffractive optical surface that is even more suitable for suppressing aberrations.

Moreover, by providing the diffractive optical surface with a reflective action, it is possible to cancel the chromatic aberration that occurs in a refractive system, to correct the aberrations of the overall optical system, and to attain a superior optical performance.

Moreover, by providing the diffractive optical surface with a transmissive action, the tolerance for the depth of the grooves of the diffraction grating is enlarged, even when that depth is increased, which makes manufacturing easier.

Moreover, the light from the object forms an intermediate image inside the optical system, so that the magnification of the optical system can be made larger.

Moreover, by placing the diffractive optical surface between the object and the intermediate image-forming position, chromatic aberration and decentration aberration can be suppressed efficiently, and a superior optical performance can be attained.

Moreover, by placing the diffractive optical surface closer to a pupil image-forming position of the light from the object, the grating pitch can be made larger than when the diffractive optical surface is arranged on the object side, so that the diffractive optical surface is easier to fabricate.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

TABLE 1

| SURF | X | Y | Z | A | R | TYP | Nd | vd |
|---|---|---|---|---|---|---|---|---|
| 1 | 0.000 | 0.000 | 0.000 | 0.000 | ∞ | SPH | 1.0000 | |
| 2 | 0.000 | 3.815 | 21.782 | 4.736 | −591.1948 | FFS1 | 1.5709 | 33.8 |
| 3 | 0.000 | 5.507 | 32.927 | −20.813 | −71.9735 | FFS2 | −1.5709 | 33.8 |
| 4 | 0.000 | 3.815 | 21.782 | 4.736 | −591.1948 | FFS1 | 1.5709 | 33.8 |
| 5 | 0.000 | 23.444 | 35.101 | 29.209 | 130.2752 | DOE | −1.5709 | 33.8 |
| 6 | 0.000 | 3.815 | 21.782 | 4.736 | −591.1948 | FFS1 | 1.5709 | 33.8 |
| 7 | 0.000 | 23.444 | 35.101 | 29.209 | 130.2752 | DOE | −1.5709 | 33.8 |
| 8 | 0.000 | 3.815 | 21.782 | 4.736 | −591.1948 | FFS1 | 1.5709 | 33.8 |
| 9 | 0.000 | 5.507 | 32.927 | −20.813 | −71.9735 | FFS2 | 1.0000 | |
| 10 | 0.000 | 1.743 | 34.467 | −53.624 | 20.6565 | FFS3 | 1.5709 | 33.8 |
| 11 | 0.000 | −5.182 | 40.856 | −49.176 | −26.5474 | FFS4 | 1.0000 | |
| 12 | 0.000 | −12.464 | 38.379 | −53.673 | 15.8253 | FFS5 | 1.5709 | 33.8 |
| 13 | 0.000 | −19.026 | 44.459 | −62.437 | −14.1719 | FFS6 | 1.0000 | |
| I | 0.000 | −23.456 | 46.771 | −69.225 | ∞ | SPH | 1.0000 | |

| | | | | |
|---|---|---|---|---|
| FFS1 | k: 2.0513e+002 | c5: −3.5191e−003 | c6: −1.8193e−003 | c10: 2.2970e−005 |
| | c11: 1.9187e−005 | c12: 2.6224e−007 | c13: 9.8262e−008 | c14: 1.1735e−007 |
| FFS2 | k: −5.2786e+000 | c5: −1.8223e−003 | c6: 2.9957e−004 | c10: 1.6362e−005 |
| | c11: 1.5082e−005 | c12: 6.1992e−008 | c13: 2.2210e−007 | c14: −2.8698e−007 |
| FFS3 | k: −4.1282e−001 | c5: 1.9701e−003 | c6: 2.0863e−003 | c10: −2.1866e−004 |
| | c11: 6.5644e−005 | c12: 8.7286e−007 | c13: −5.4050e−006 | c14: −1.1442e−005 |
| FFS4 | k: −1.2064e+001 | c5: 1.6019e−003 | c6: −2.2853e−003 | c10: 1.4231e−004 |
| | c11: −7.4927e−005 | c12: 3.2044e−006 | c13: −1.6219e−005 | c14: 1.9174e−006 |
| FFS5 | k: −2.3376e+000 | c5: 1.1449e−003 | c6: 4.6690e−003 | c10: 8.4970e−005 |
| | c11: −1.6848e−004 | c12: −1.4690e−005 | c13: 2.6631e−005 | c14: −7.5778e−006 |
| FFS6 | k: −1.0077e+001 | c5: 1.1093e−002 | c6: −3.7213e−003 | c10: −2.9661e−004 |
| | c11: 1.9758e−004 | c12: −9.3602e−006 | c13: 4.7530e−006 | c14: −2.6257e−006 |
| DOE | RDX: −82.7100 | | | |
| | c3: 7.5711e−003 | c5: 1.4625e−002 | c7: −1.6368e−004 | c9: −1.8620e−004 |
| | c10: 3.3562e−006 | c12: −9.1350e−006 | c14: −9.2010e−006 | c16: 1.7604e−007 |
| | c18: 9.2676e−008 | c20: −6.1994e−007 | c21: −2.2531e−008 | c23: −9.2980e−009 |
| | c25: 2.0598e−008 | c27: 2.6539e−008 | | | ry: 130.2752 rx: −82.7100
|ry/rx| = 1.57508
|θ| = 1.70138

TABLE 2

| SURF | X | Y | Z | A | R | TYP | Nd | vd |
|---|---|---|---|---|---|---|---|---|
| 1 | 0.000 | 0.000 | 0.000 | 0.000 | ∞ | SPH | 1.0000 | |
| 2 | 0.000 | −8.319 | 22.558 | 2.423 | −135.9684 | FFS1 | 1.5709 | 33.8 |
| 3 | 0.000 | −5.001 | 32.009 | −24.881 | −57.5562 | FFS2 | −1.5709 | 33.8 |
| 4 | 0.000 | −8.319 | 22.558 | 2.423 | −135.9684 | FFS1 | 1.5709 | 33.8 |
| 5 | 0.000 | 14.525 | 41.644 | 25.350 | −110.6239 | FFS3 | −1.5709 | 33.8 |
| 6 | 0.000 | −8.319 | 22.558 | 2.423 | −135.9684 | FFS1 | 1.5709 | 33.8 |

TABLE 2-continued

| | | | | | | | | |
|---|---|---|---|---|---|---|---|---|
| 7 | 0.000 | 14.525 | 41.644 | 25.350 | −110.6239 | FFS3 | −1.5709 | 33.8 |
| 8 | 0.000 | −8.319 | 22.558 | 2.423 | −135.9684 | FFS1 | 1.5709 | 33.8 |
| 9 | 0.000 | −5.001 | 32.009 | −24.881 | −57.5562 | FFS2 | 1.0000 | |
| 10 | 0.000 | −12.377 | 29.693 | −46.248 | 13.2222 | DOE | 1.5709 | 33.8 |
| 11 | 0.000 | −9.464 | 41.343 | −25.291 | −123.6260 | FFS4 | −1.5709 | 33.8 |
| 12 | 0.000 | −13.869 | 28.451 | −2.707 | 16.4755 | FFS5 | −1.0000 | |
| I | 0.000 | −13.530 | 21.279 | 2.666 | ∞ | SPH | −1.0000 | |

| | | | | | |
|---|---|---|---|---|---|
| FFS1 | k: −3.7175e−001 | c5: −2.6891e−003 | c6: −2.8038e−004 | c10: 6.5986e−007 | |
| | c11: −1.4493e−005 | c12: −1.4309e−007 | c13: −1.1840e−007 | c14: −1.8678e−008 | |
| FFS2 | k: −8.7330e−001 | c5: −1.2109e−003 | c6: 7.3874e−004 | c10: −3.0650e−006 | |
| | c11: −1.7408e−006 | c12: −1.9379e−008 | c13: −9.5094e−008 | c14: 9.0863e−008 | |
| FFS3 | k: 3.7687e−001 | c5: −1.9039e−003 | c6: −4.2267e−004 | c10: 3.2470e−006 | |
| | c11: −1.9590e−005 | c12: 6.4839e−008 | c13: −1.6294e−007 | c14: 6.3927e−008 | |
| FFS4 | k: −1.7632e+001 | c5: −2.0510e−003 | c6: −1.2834e−004 | c10: 2.3088e−005 | |
| | c11: 2.3687e−005 | c12: 1.2822e−006 | c13: 1.4249e−006 | c14: 3.3494e−007 | |
| FFS5 | k: −8.0457e−001 | c5: −2.4195e−003 | c6: −5.5023e−003 | c10: −2.9717e−004 | |
| | c11: −3.1674e−004 | c12: 1.0001e−005 | c13: −7.1488e−007 | c14: −1.4899e−005 | |
| DOE | RDX: 14.8582 | | | | |
| | c3: 3.3651e−003 | c5: 8.4527e−004 | c7: 9.5457e−004 | c9: 7.4535e−004 | |
| | c10: −4.1787e−005 | c12: −1.1579e−004 | c14: −4.0035e−005 | c16: 1.7368e−006 | |
| | c18: 3.5161e−006 | c20: −8.4464e−007 | c21: −2.8283e−008 | c23: −2.4398e−007 | |
| | c25: −3.0700e−007 | c27: −2.7029e−008 | | | | ry: 13.2222 rx: 14.8582
|ry/rx| = 0.889892
|θ| = 7.20831

TABLE 3

| SURF | X | Y | Z | A | R | TYP | Nd | vd |
|---|---|---|---|---|---|---|---|---|
| 1 | 0.000 | 0.000 | 0.000 | 0.000 | ∞ | SPH | 1.0000 | |
| 2 | 0.000 | −10.839 | 25.216 | 1.181 | −151.5980 | FFS1 | 1.5709 | 33.8 |
| 3 | 0.000 | −3.645 | 34.315 | −26.716 | −60.5731 | FFS2 | −1.5709 | 33.8 |
| 4 | 0.000 | −10.839 | 25.216 | 1.181 | −151.5980 | FFS1 | 1.5709 | 33.8 |
| 5 | 0.000 | 6.122 | 48.364 | 20.342 | −104.1369 | FFS3 | −1.5709 | 33.8 |
| 6 | 0.000 | −10.839 | 25.216 | 1.181 | −151.5980 | FFS1 | 1.5709 | 33.8 |
| 7 | 0.000 | 6.122 | 48.364 | 20.342 | −104.1369 | FFS3 | −1.5709 | 33.8 |
| 8 | 0.000 | −10.839 | 25.216 | 1.181 | −151.5980 | FFS1 | 1.5709 | 33.8 |
| 9 | 0.000 | −3.645 | 34.315 | −26.716 | −60.5731 | FFS2 | 1.0000 | |
| 10 | 0.000 | −13.508 | 31.064 | −55.926 | 13.7286 | FFS4 | 1.5709 | 33.8 |
| 11 | 0.000 | −15.776 | 49.699 | −40.658 | −79.0781 | DOE | −1.5709 | 33.8 |
| 12 | 0.000 | −15.118 | 29.092 | −40.287 | 13.8402 | FFS5 | −1.0000 | |
| I | 0.000 | −12.417 | 25.905 | −31.729 | ∞ | SPH | −1.0000 | |

| | | | | | |
|---|---|---|---|---|---|
| FFS1 | k: −1.6187e+001 | c5: −3.2779e−003 | c6: −2.4473e−004 | c10: −1.6168e−006 | |
| | c11: 7.9730e−006 | c12: 9.7756e−008 | c13: −1.2877e−007 | c14: −4.2656e−008 | |
| FFS2 | k: −3.2694e−001 | c5: −1.0317e−003 | c6: 7.8838e−004 | c10: 4.3191e−006 | |
| | c11: 4.6271e−006 | c12: 8.0559e−008 | c13: −8.6819e−008 | c14: 1.0100e−007 | |
| FFS3 | k: −9.3564e−001 | c5: −9.5414e−004 | c6: −6.9472e−004 | c10: 1.9612e−005 | |
| | c11: 1.8169e−007 | c12: 4.0128e−007 | c13: −1.1332e−007 | c14: −1.2361e−008 | |
| FFS4 | k: −9.9112e−001 | c5: −5.7145e−003 | c6: −3.4839e−003 | c10: 1.4944e−004 | |
| | c11: −1.1129e−005 | c12: −2.3097e−006 | c13: 1.7453e−006 | c14: −2.7094e−006 | |
| FFS5 | k: 1.1339e−001 | c5: 1.0683e−002 | c6: −6.0148e−003 | c10: −6.9559e−004 | |
| | c11: 8.0207e−004 | c12: −4.8189e−005 | c13: 2.3207e−005 | c14: −2.3276e−005 | |
| DOE | RDX: −47.3876 | | | | |
| | c3: −3.9644e−003 | c5: −3.5756e−003 | c7: −1.7891e−004 | c9: −7.6612e−006 | |
| | c10: −4.6138e−005 | c12: 2.6998e−005 | c14: 3.1750e−006 | c16: −5.8261e−006 | |
| | c18: −1.3849e−006 | c20: −2.2456e−007 | c21: −1.3260e−008 | c23: −3.8670e−007 | |
| | c25: −1.1152e−007 | c27: −8.0211e−009 | | | | ry: −79.0781 rx: −47.3876
|ry/rx| = 1.668751
|θ| = 7.05613

TABLE 4

| SURF | X | Y | Z | A | R | TYP | Nd | vd |
|---|---|---|---|---|---|---|---|---|
| 1 | 0.000 | 0.000 | 0.000 | 0.000 | ∞ | SPH | 1.0000 | |
| 2 | 0.000 | 0.604 | 23.830 | 8.861 | −365.6785 | FFS1 | 1.5709 | 33.8 |
| 3 | 0.000 | 1.114 | 37.011 | −16.177 | −96.5047 | FFS2 | −1.5709 | 33.8 |
| 4 | 0.000 | 0.604 | 23.830 | 8.861 | −365.6785 | FFS1 | 1.5709 | 33.8 |

TABLE 4-continued

| | | | | | | | | |
|---|---|---|---|---|---|---|---|---|
| 5 | 0.000 | 26.382 | 36.165 | 31.979 | −166.4267 | FFS3 | −1.5709 | 33.8 |
| 6 | 0.000 | 0.604 | 23.830 | 8.861 | −365.6785 | FFS1 | 1.5709 | 33.8 |
| 7 | 0.000 | 26.382 | 36.165 | 31.979 | −166.4267 | FFS3 | −1.5709 | 33.8 |
| 8 | 0.000 | 0.604 | 23.830 | 8.861 | −365.6785 | FFS1 | 1.5709 | 33.8 |
| 9 | 0.000 | 1.114 | 37.011 | −16.177 | −96.5047 | FFS2 | 1.0000 | |
| 10 | 0.000 | −8.333 | 35.659 | −47.065 | 17.5153 | FFS4 | 1.5709 | 33.8 |
| 11 | 0.000 | 8.004 | 43.295 | −6.070 | 845.0365 | FFS5 | −1.5709 | 33.8 |
| 12 | 0.000 | −9.011 | 28.893 | 14.999 | 57.2825 | DOE | 1.5709 | 33.8 |
| 13 | 0.000 | 8.004 | 43.295 | −6.070 | 845.0364 | FFS5 | 1.0000 | |
| I | 0.000 | −7.987 | 44.425 | 22.013 | ∞ | SPH | 1.0000 | |

| | | | | |
|---|---|---|---|---|
| FFS1 | k: 8.3326e+001 | c5: −6.2213e−004 | c6: 3.3469e−004 | c10: 5.0605e−006 |
| | c11: −1.5352e−006 | c12: 3.1156e−007 | c13: 8.5242e−008 | c14: 5.2947e−008 |
| FFS2 | k: −1.2060e+000 | c5: 1.3742e−004 | c6: −2.0637e−004 | c10: −2.2680e−006 |
| | c11: −6.2732e−006 | c12: 1.4769e−007 | c13: 7.0448e−008 | c14: 4.2680e−008 |
| FFS3 | k: −7.7330e+000 | c5: −2.1564e−003 | c6: 1.4469e−004 | c10: 3.3743e−006 |
| | c11: −1.9483e−005 | c12: 7.7684e−008 | c13: 3.0035e−007 | c14: −1.6260e−007 |
| FFS4 | k: −3.3203e+000 | c5: −5.5176e−003 | c6: 2.6299e−004 | c10: 6.9607e−005 |
| | c11: −7.5531e−005 | c12: 1.3678e−006 | c13: −4.4180e−006 | c14: 1.8681e−006 |
| FFS5 | k: −8.3726e+001 | c5: 2.2429e−004 | c6: 2.0466e−004 | c10: −1.6778e−006 |
| | c11: −2.7590e−006 | c12: −2.2380e−007 | c13: −5.4560e−008 | c14: 4.3814e−008 |
| DOE | RDX: 37.6964 | | | |
| | c3: 2.0912e−003 | c5: −5.2286e−003 | c7: −2.6534e−005 | c9: −3.4283e−004 |
| | c10: 8.0727e−007 | c12: −1.7135e−005 | c14: −1.5715e−005 | c16: 5.2983e−008 |
| | c18: −1.2166e−006 | c20: −6.8782e−007 | c21: −1.5022e−009 | c23: 5.5936e−009 |
| | c25: −2.2708e−008 | c27: −1.2414e−008 | | | ry: 57.2825 rx: 37.6964
|ry/rx| = 1.519575
|θ| = 7.20136

TABLE 5

| SURF | X | Y | Z | A | R | TYP | Nd | vd |
|---|---|---|---|---|---|---|---|---|
| 1 | 0.000 | 0.000 | 0.000 | 0.000 | ∞ | SPH | 1.0000 | |
| 2 | 0.000 | −4.712 | 23.049 | 8.715 | −408.6169 | FFS1 | 1.5709 | 33.8 |
| 3 | 0.000 | −6.088 | 29.511 | −24.680 | −66.8857 | FFS2 | −1.5709 | 33.8 |
| 4 | 0.000 | −4.712 | 23.049 | 8.715 | −408.6169 | FFS1 | 1.5709 | 33.8 |
| 5 | 0.000 | 27.985 | 32.090 | 30.623 | −186.5710 | FFS3 | −1.5709 | 33.8 |
| 6 | 0.000 | −4.712 | 23.049 | 8.715 | −408.6169 | FFS1 | 1.5709 | 33.8 |
| 7 | 0.000 | 27.985 | 32.090 | 30.623 | −186.5710 | FFS3 | −1.5709 | 33.8 |
| 8 | 0.000 | −4.712 | 23.049 | 8.715 | −408.6169 | FFS1 | 1.5709 | 33.8 |
| 9 | 0.000 | −6.088 | 29.511 | −24.680 | −66.8857 | FFS2 | 1.5709 | 33.8 |
| 10 | 0.000 | −12.570 | 27.905 | −48.339 | −23.1433 | FFS4 | 1.0000 | |
| 11 | 0.000 | −16.280 | 33.625 | −46.455 | 16.1299 | DOE | 1.5709 | 33.8 |
| 12 | 0.000 | −28.554 | 41.209 | −64.108 | −25.1119 | FFS5 | 1.0000 | |
| I | 0.000 | −35.795 | 44.724 | −61.728 | ∞ | SPH | 1.0000 | |

| | | | | |
|---|---|---|---|---|
| FFS1 | k: 1.3043e+000 | c5: −3.7351e−003 | c6: −4.3116e−004 | c10: −1.2066e−006 |
| | c11: −7.0619e−006 | c12: 4.4430e−008 | c13: −1.1218e−007 | c14: −7.6300e−008 |
| FFS2 | k: −4.3357e+000 | c5: −2.8248e−003 | c6: 1.2570e−004 | c10: −1.7618e−005 |
| | c11: 7.2567e−006 | c12: 8.6173e−008 | c13: 1.1782e−008 | c14: −6.8840e−009 |
| FFS3 | k: −1.1492e+002 | c5: −4.6403e−003 | c6: −2.4881e−004 | c10: 2.1338e−005 |
| | c11: −5.6306e−005 | c12: 4.9787e−007 | c13: −3.9692e−007 | c14: −8.5655e−008 |
| FFS4 | k: −5.0682e+000 | c5: −1.2046e−002 | c6: 1.3592e−003 | c10: −3.7197e−004 |
| | c11: 8.9028e−005 | c12: −3.9228e−007 | c13: −9.4258e−007 | c14: 3.1679e−006 |
| FFS5 | k: −1.8125e+000 | c5: −2.0856e−003 | c6: 5.0901e−004 | c10: −2.5523e−004 |
| | c11: 6.8935e−005 | c12: 1.2536e−006 | c13: −3.2072e−006 | c14: 9.0783e−006 |
| DOE | RDX: 15.3424 | | | |
| | c3: 2.9102e−003 | c5: 2.7539e−003 | c7: −1.6428e−004 | c9: −2.1512e−005 |
| | c10: 1.9847e−005 | c12: 2.8404e−005 | c14: 3.0684e−006 | c16: 2.1420e−006 |
| | c18: 2.5836e−006 | c20: 4.1368e−007 | c21: −1.7703e−007 | c23: −4.3726e−007 |
| | c25: −2.7746e−007 | c27: −2.7388e−008 | | | ry: 16.1299 rx: 15.3424
|ry/rx| = 1.051328
|θ| = 8.35563

TABLE 6

| SURF | X | Y | Z | A | R | TYP | Nd | vd |
|---|---|---|---|---|---|---|---|---|
| 1 | 0.000 | 0.000 | 0.000 | 0.000 | ∞ | SPH | 1.0000 | |
| 2 | 0.000 | −2.633 | 20.688 | −0.881 | −338.9521 | FFS1 | 1.5709 | 33.8 |
| 3 | 0.000 | −4.843 | 33.459 | −25.562 | −72.0739 | FFS2 | −1.5709 | 33.8 |
| 4 | 0.000 | −2.633 | 20.688 | −0.881 | −338.9521 | FFS1 | 1.5709 | 33.8 |
| 5 | 0.000 | 18.925 | 40.810 | 43.743 | −178.1984 | DOE | −1.5709 | 33.8 |
| 6 | 0.000 | −2.633 | 20.688 | −0.881 | −338.9521 | FFS1 | 1.5709 | 33.8 |
| 7 | 0.000 | −4.843 | 33.459 | −25.562 | −72.0739 | FFS2 | 1.0000 | |
| 8 | 0.000 | −12.156 | 32.361 | −63.209 | 15.5951 | FFS3 | 1.5709 | 33.8 |
| 9 | 0.000 | −23.072 | 36.571 | −43.394 | −45.9970 | FFS4 | −1.5709 | 33.8 |
| 10 | 0.000 | −26.400 | 26.446 | −4.483 | 29.1952 | FFS5 | −1.0000 | |
| I | 0.000 | −25.674 | 17.182 | −30.234 | ∞ | SPH | −1.0000 | |

FFS1  k: 8.4294e+001    c5: −1.3632e−003    c6: 1.5547e−005    c10: −5.3731e−006
      c11: 5.1856e−006    c12: −1.7214e−007    c13: −1.4542e−007    c14: −1.1147e−008
FFS2  k: 1.2462e+000    c5: 1.4787e−004    c6: 1.2592e−004    c10: −8.2230e−006
      c11: 3.2147e−006    c12: −1.2239e−007    c13: −8.1086e−008    c14: 1.1905e−007
FFS3  k: −8.4686e−001    c5: −2.4786e−003    c6: −4.2110e−004    c10: 1.2245e−005
      c11: −2.1634e−004    c12: 4.3959e−006    c13: 5.0327e−006    c14: −1.6255e−005
FFS4  k: −2.6148e+000    c5: −1.5913e−003    c6: −6.7071e−004    c10: −5.5366e−006
      c11: −6.5752e−005    c12: 1.4738e−006    c13: 2.7919e−006    c14: 7.4486e−007
FFS5  k: −2.1813e+000    c5: 1.2306e−002    c6: −2.8726e−003    c10: −9.3725e−005
      c11: 2.1583e−005    c12: −1.8921e−005    c13: −4.8306e−006    c14: 4.2891e−006
DOE   RDX: −87.8762
      c3: 8.2233e−004    c5: 4.2038e−003    c7: 5.6169e−006    c9: 8.9910e−007
      c10: −1.6100e−006    c12: 1.2507e−005    c14: −9.4524e−006    c16: 2.7284e−007
      c18: 8.6595e−007    c20: −1.4472e−007    c21: 2.2468e−010    c23: −3.0748e−008
      c25: −7.2381e−008    c27: 1.6602e−008 ry: −178.1984 rx: −87.8762
|ry/rx| = 2.027835
|θ| = 7.95486

TABLE 7

| SURF | X | Y | Z | A | R | TYP | Nd | vd |
|---|---|---|---|---|---|---|---|---|
| 1 | 0.000 | 0.000 | 0.000 | 0.000 | ∞ | SPH | 1.0000 | |
| 2 | 0.000 | −5.115 | 23.410 | 5.498 | −184.6585 | FFS1 | 1.5709 | 33.8 |
| 3 | 0.000 | −3.582 | 33.687 | −19.930 | −55.8586 | FFS2 | −1.5709 | 33.8 |
| 4 | 0.000 | −5.115 | 23.410 | 5.498 | −184.6585 | FFS1 | 1.5709 | 33.8 |
| 5 | 0.000 | 14.588 | 44.356 | 50.687 | −197.3319 | FFS3 | −1.5709 | 33.8 |
| 6 | 0.000 | −5.115 | 23.410 | 5.498 | −184.6585 | FFS1 | 1.5709 | 33.8 |
| 7 | 0.000 | −3.582 | 33.687 | −19.930 | −55.8586 | FFS2 | 1.0000 | |
| 8 | 0.000 | −6.418 | 37.997 | −58.741 | 20.6653 | FFS4 | 1.5709 | 33.8 |
| 9 | 0.000 | −27.276 | 39.073 | −43.869 | −41.8268 | DOE | −1.5709 | 33.8 |
| 10 | 0.000 | −36.997 | 23.525 | 6.386 | 27.2248 | FFS5 | −1.0000 | |
| I | 0.000 | −37.930 | 15.193 | −16.170 | ∞ | SPH | −1.0000 | |

FFS1  k: 1.0945e+001    c5: −2.3269e−003    c6: −5.6688e−004    c10: −2.4295e−005
      c11: −4.4611e−005    c12: 4.6429e−007    c13: −3.2117e−007    c14: 7.8959e−008
FFS2  k: −3.4095e+000    c5: −1.3883e−003    c6: −1.2144e−004    c10: 6.5084e−007
      c11: −1.7824e−005    c12: −1.0641e−007    c13: −1.2456e−007    c14: −1.7628e−007
FFS3  k: 1.5360e+001    c5: −5.3772e−004    c6: −6.2238e−005    c10: −3.2826e−005
      c11: −1.9615e−005    c12: 1.3247e−006    c13: −1.7098e−007    c14: 2.6970e−007
FFS4  k: 5.7017e−002    c5: 8.4410e−003    c6: −6.8462e−003    c10: −4.9924e−004
      c11: 1.8082e−004    c12: 2.3643e−006    c13: 4.9810e−006    c14: −6.8786e−006
FFS5  k: −2.7103e−001    c5: 9.7920e−003    c6: −2.6454e−003    c10: 1.4333e−005
      c11: 5.6119e−004    c12: 3.9908e−006    c13: −4.8649e−007    c14: 2.2789e−006
DOE   RDX: −40.3325
      c3: 2.8829e−003    c5: 2.1629e−003    c7: 2.7375e−004    c9: 3.9101e−005
      c10: −4.0313e−005    c12: −9.6246e−005    c14: −1.2085e−005    c16: 3.9079e−006
      c18: 6.6074e−006    c20: 2.1120e−007    c21: 2.9389e−009    c23: −1.5837e−007
      c25: −1.5321e−007    c27: 9.7335e−009 ry: −41.8268 rx: −40.3325
|ry/rx| = 1.03705
|θ| = 9.28481

TABLE 8

| SURF | X | Y | Z | A | R | TYP | Nd | vd |
|---|---|---|---|---|---|---|---|---|
| 1 | 0.000 | 0.000 | 0.000 | 0.000 | ∞ | SPH | 1.0000 | |
| 2 | 0.000 | −0.408 | 20.379 | 5.865 | 578.2431 | FFS1 | 1.5709 | 33.8 |
| 3 | 0.000 | 0.842 | 34.287 | −19.611 | −90.1582 | FFS2 | −1.5709 | 33.8 |
| 4 | 0.000 | −0.408 | 20.379 | 5.865 | 578.2431 | FFS1 | 1.5709 | 33.8 |
| 5 | 0.000 | 23.304 | 39.329 | 53.210 | −170.0605 | FFS3 | −1.5709 | 33.8 |
| 6 | 0.000 | −0.408 | 20.379 | 5.865 | 578.2431 | FFS1 | 1.5709 | 33.8 |
| 7 | 0.000 | 0.842 | 34.287 | −19.611 | −90.1582 | FFS2 | 1.0000 | |
| 8 | 0.000 | −10.049 | 31.726 | −48.082 | 14.4589 | FFS4 | 1.5709 | 33.8 |
| 9 | 0.000 | −17.451 | 47.618 | −83.542 | −87.6263 | DOE | −1.5709 | 33.8 |
| 10 | 0.000 | −5.557 | 18.515 | −66.907 | 20.0861 | FFS5 | −1.0000 | |
| I | 0.000 | 4.870 | 14.068 | −106.260 | ∞ | SPH | −1.0000 | |

| | | | | |
|---|---|---|---|---|
| FFS1 | k: −4.6097e+003 | c5: −5.3858e−004 | c6: 5.5225e−004 | c10: 9.0904e−006 |
| | c11: 1.6069e−006 | c12: 2.4174e−007 | c13: −9.3697e−008 | c14: 1.8977e−008 |
| FFS2 | k: −1.3593e+001 | c5: −7.2049e−004 | c6: −3.7191e−004 | c10: −5.1672e−006 |
| | c11: 5.0850e−007 | c12: 8.4632e−008 | c13: 6.9023e−008 | c14: −1.3592e−007 |
| FFS3 | k: 6.2796e+001 | c5: −3.0726e−003 | c6: 1.0726e−003 | c10: −1.1546e−004 |
| | c11: 8.9877e−005 | c12: 3.0675e−006 | c13: −4.2711e−006 | c14: 3.4986e−006 |
| FFS4 | k: −1.0152e+000 | c5: 1.7158e−003 | c6: −2.2606e−003 | c10: 1.6643e−004 |
| | c11: 1.5547e−005 | c12: 6.7787e−007 | c13: 8.2289e−007 | c14: −7.9604e−006 |
| FFS5 | k: −1.0295e+000 | c5: 3.3092e−002 | c6: 3.6041e−003 | c10: 1.4961e−004 |
| | c11: 4.7314e−004 | c12: 2.9389e−005 | c13: −1.8310e−005 | c14: −1.7204e−006 |
| DOE | RDX: −51.5121 | | | |
| | c3: 1.8437e−003 | c5: −8.0939e−003 | c7: −4.5922e−004 | c9: −6.4353e−004 |
| | c10: 2.6680e−005 | c12: −5.2161e−005 | c14: −1.3631e−005 | c16: 6.5946e−006 |
| | c18: −1.6021e−006 | c20: 4.6260e−007 | c21: 1.0683e−007 | c23: 3.1145e−007 |
| | c25: 1.3755e−008 | c27: 2.0456e−008 | | | ry: −87.6263 rx: −51.5121
|ry/rx| = 1.701082
|θ| = 15.7648

TABLE 9

| SURF | X | Y | Z | A | R | TYP | Nd | vd |
|---|---|---|---|---|---|---|---|---|
| 1 | 0.000 | 0.000 | 0.000 | 0.000 | ∞ | SPH | 1.0000 | |
| 2 | 0.000 | −3.961 | 21.702 | 6.220 | −4779.5578 | FFS1 | 1.5709 | 33.8 |
| 3 | 0.000 | −3.804 | 32.408 | −20.824 | −81.6926 | FFS2 | −1.5709 | 33.8 |
| 4 | 0.000 | −3.961 | 21.702 | 6.220 | −4779.5578 | FFS1 | 1.5709 | 33.8 |
| 5 | 0.000 | 18.242 | 37.190 | 51.646 | −136.2848 | FFS3 | −1.5709 | 33.8 |
| 6 | 0.000 | −3.961 | 21.702 | 6.220 | −4779.5578 | FFS1 | 1.5709 | 33.8 |
| 7 | 0.000 | −3.804 | 32.408 | −20.824 | −81.6926 | FFS2 | 1.0000 | |
| 8 | 0.000 | −9.773 | 33.475 | −54.648 | 14.6031 | FFS4 | 1.5709 | 33.8 |
| 9 | 0.000 | −18.608 | 37.561 | −91.484 | −71.2471 | FFS5 | −1.5709 | 33.8 |
| 10 | 0.000 | −3.756 | 22.023 | −79.562 | 24.1970 | DOE | −1.0000 | |
| I | 0.000 | 10.930 | 19.317 | −110.957 | ∞ | SPH | 1.0000 | |

| | | | | |
|---|---|---|---|---|
| FFS1 | k: 1.9718e+003 | c5: 4.8413e−004 | c6: 6.7949e−004 | c10: 1.3745e−005 |
| | c11: −8.7909e−007 | c12: 2.1191e−008 | c13: −1.6838e−007 | c14: 1.5668e−008 |
| FFS2 | k: 2.3455e+000 | c5: −6.4647e−004 | c6: −2.0767e−004 | c10: −1.2851e−006 |
| | c11: −2.9647e−006 | c12: −8.3261e−008 | c13: 2.2815e−007 | c14: 1.6870e−007 |
| FFS3 | k: −3.3795e+000 | c5: −6.6526e−004 | c6: 1.8088e−004 | c10: −5.4426e−005 |
| | c11: 7.2968e−005 | c12: 4.1099e−006 | c13: −6.2323e−006 | c14: 4.0645e−006 |
| FFS4 | k: −7.6307e−001 | c5: 2.2547e−003 | c6: −4.6245e−003 | c10: 5.4318e−005 |
| | c11: −8.8129e−006 | c12: 3.5757e−006 | c13: 3.0088e−006 | c14: −8.5676e−006 |
| FFS5 | k: −3.5015e+001 | c5: −1.0345e−003 | c6: 1.6884e−004 | c10: 3.1773e−005 |
| | c11: −1.5889e−005 | c12: 1.0354e−006 | c13: 7.2954e−007 | c14: −8.3935e−007 |
| DOE | RDX: 30.6667 | | | |
| | c3: 7.5857e−003 | c5: −6.8457e−003 | c7: 1.5547e−004 | c9: 1.2062e−004 |
| | c10: −3.8031e−005 | c12: −5.1649e−006 | c14: 8.8630e−006 | c16: −1.3128e−007 |
| | c18: −5.2502e−007 | c20: 2.0541e−007 | c21: −4.9306e−008 | c23: 9.8305e−008 |
| | c25: 1.6534e−009 | c27: −1.2109e−008 | | | ry: 24.1970 rx: 30.6667
|ry/rx| = 0.789032
|θ| = 18.3278

TABLE 10

| SURF | X | Y | Z | A | R | TYP | Nd | vd |
|---|---|---|---|---|---|---|---|---|
| 1 | 0.000 | 0.000 | 0.000 | 0.000 | ∞ | SPH | 1.0000 | |
| 2 | 0.000 | 3.932 | 19.915 | 4.872 | 609.1991 | FFS1 | 1.5709 | 33.8 |
| 3 | 0.000 | 2.059 | 34.475 | −19.066 | −85.4128 | FFS2 | −1.5709 | 33.8 |
| 4 | 0.000 | 3.932 | 19.915 | 4.872 | 609.1991 | FFS1 | 1.5709 | 33.8 |
| 5 | 0.000 | 26.525 | 36.018 | 51.848 | −271.2322 | FFS3 | −1.5709 | 33.8 |
| 6 | 0.000 | 3.932 | 19.915 | 4.872 | 609.1991 | FFS1 | 1.5709 | 33.8 |
| 7 | 0.000 | 2.059 | 34.475 | −19.066 | −85.4128 | FFS2 | 1.0000 | |
| 8 | 0.000 | −18.182 | 24.748 | −27.929 | 23.7590 | DOE | 1.5300 | 55.8 |
| 9 | 0.000 | −20.352 | 36.230 | −93.007 | −46.5501 | FFS4 | −1.5300 | 55.8 |
| 10 | 0.000 | 0.046 | 28.018 | −73.101 | 17.3086 | FFS5 | −1.0000 | |
| I | 0.000 | 9.508 | 25.143 | −113.952 | ∞ | SPH | 1.0000 | |

FFS1  k: −2.8051e+003     c5: 7.3888e−005     c6: 8.9521e−004     c10: 1.1406e−005
      c11: −4.8935e−006   c12: 1.0581e−007    c13: −2.1568e−007   c14: 4.9113e−008
FFS2  k: −1.0039e+001     c5: −9.5847e−004    c6: −3.8488e−004    c10: −5.3776e−006
      c11: −6.0138e−006   c12: 5.2225e−008    c13: 1.2070e−007    c14: −3.0693e−008
FFS3  k: 3.8005e+001      c5: −2.1540e−003    c6: 7.9897e−004     c10: 1.4213e−004
      c11: −8.6853e−005   c12: 3.0070e−006    c13: −3.7642e−006   c14: 2.6316e−006
FFS4  k: −6.7485e−001     c5: −1.8836e−003    c6: 1.8739e−003     c10: −2.0287e−005
      c11: −8.7526e−006   c12: 6.3680e−007    c13: −1.5862e−007   c14: 1.8720e−007
FFS5  k: −3.2038e−001     c5: −4.5885e−002    c6: 1.3315e−003     c10: 2.2299e−004
      c11: −3.5473e−004   c12: 1.4737e−006    c13: 1.5433e−005    c14: −8.4510e−006
DOE   RDX: 23.0000
      c3: −2.0334e−003    c5: 3.6909e−004     c7: 7.3515e−004     c9: 3.1192e−004
      c10: −2.7016e−006   c12: −5.0634e−005   c14: −4.3568e−005   c16: 2.3297e−007
      c18: 2.4112e−006    c20: 2.9669e−006    c21: −2.2403e−008   c23: −3.7317e−008
      c25: −7.2909e−008   c27: −7.2119e−008 ry: 23.7590 rx: 23.0000
|ry/rx| = 1.033
|θ| = 10.8314

TABLE 11

| SURF | X | Y | Z | A | R | TYP | Nd | vd |
|---|---|---|---|---|---|---|---|---|
| 1 | 0.000 | 0.000 | 0.000 | 0.000 | ∞ | SPH | 1.0000 | |
| 2 | 0.000 | −3.223 | 20.402 | 0.681 | −328.3443 | FFS1 | 1.5745 | 33.8 |
| 3 | 0.000 | −4.436 | 29.715 | −27.347 | −64.1323 | FFS2 | −1.5745 | 33.8 |
| 4 | 0.000 | −3.223 | 20.402 | 0.681 | −328.3443 | FFS1 | 1.5745 | 33.8 |
| 5 | 0.000 | 14.561 | 39.055 | 48.134 | −170.6411 | FFS3 | −1.5745 | 33.8 |
| 6 | 0.000 | −3.223 | 20.402 | 0.681 | −328.3443 | FFS3 | 1.5745 | 33.8 |
| 7 | 0.000 | −4.436 | 29.715 | −27.347 | −64.1323 | FFS2 | 1.0000 | |
| 8 | 0.000 | −4.799 | 30.417 | −31.833 | ∞ | DOE | 1.5745 | 33.8 |
| 9 | 0.000 | −5.327 | 31.267 | −31.833 | ∞ | SPH | −1.5745 | |
| 10 | 0.000 | −10.108 | 33.357 | −60.862 | 14.6905 | FFS4 | 1.5745 | 33.8 |
| 11 | 0.000 | −19.168 | 37.670 | −97.429 | −71.0571 | FFS5 | −1.5745 | 33.8 |
| 12 | 0.000 | −3.501 | 27.925 | −80.863 | 20.7364 | FFS6 | −1.0000 | |
| I | 0.000 | 8.929 | 25.925 | −120.181 | ∞ | SPH | −1.0000 | |

FFS1  k: 3.9271e+001      c5: 5.1808e−005     c6: 3.3641e−004     c10: 7.1644e−006
      c11: −7.6390e−006   c12: −1.0950e−008   c13: −2.3860e−007   c14: −1.2554e−008
FFS2  k: 1.0853e+000      c5: −5.6219e−004    c6: −4.2695e−004    c10: −8.7997e−006
      c11: −8.5128e−006   c12: −7.5498e−008   c13: 1.6377e−007    c14: 1.9831e−007
FFS3  k: −1.2146e+001     c5: −3.2362e−003    c6: 9.7296e−005     c10: −1.4916e−004
      c11: 1.3917e−004    c12: 2.3988e−006    c13: −3.2891e−006   c14: 2.4709e−006
FFS4  k: −1.0734e+000     c5: 3.8363e−003     c6: −2.5533e−003    c10: 2.3884e−004
      c11: −4.8940e−006   c12: −1.3678e−006   c13: 9.9942e−006    c14: −1.4491e−005
FFS5  k: −2.2443e+001     c5: −2.3071e−004    c6: 1.8413e−005     c10: 1.7828e−005
      c11: 6.2472e−006    c12: 6.5218e−007    c13: 1.1340e−006    c14: −1.0444e−006
FFS6  k: −8.3695e−001     c5: 7.5828e−003     c6: 1.8588e−003     c10: 9.6469e−005
      c11: −1.4635e−004   c12: −2.6591e−006   c13: −6.3139e−006   c14: 1.3123e−006
DOE   RDX: ∞
      c3: 7.3252e−003     c5: 7.3252e−003     c10: 1.6381e−005    c12: 3.2763e−005
      c14: 1.6381e−005 ry: ∞ rx: ∞
|ry/rx| = 1
|θ| = 6.26059

TABLE 12

| SURF | X | Y | Z | A | R | TYP | Nd | vd |
|---|---|---|---|---|---|---|---|---|
| 1 | 0.000 | 0.000 | 0.000 | 0.000 | ∞ | SPH | 1.0000 | |
| 2 | 0.000 | −2.121 | 20.449 | −0.153 | −333.9006 | FFS1 | 1.5745 | 33.8 |
| 3 | 0.000 | −2.681 | 32.058 | −24.314 | −66.4550 | FFS2 | −1.5745 | 33.8 |
| 4 | 0.000 | −2.121 | 20.449 | −0.153 | −333.9006 | FFS1 | 1.5745 | 33.8 |
| 5 | 0.000 | 15.366 | 39.881 | 46.343 | −218.8076 | FFS3 | −1.5745 | 33.8 |
| 6 | 0.000 | −2.121 | 20.449 | −0.153 | −333.9006 | FFS3 | 1.5745 | 33.8 |
| 7 | 0.000 | −2.681 | 32.058 | −24.314 | −66.4550 | FFS2 | 1.0000 | |
| 8 | 0.000 | −2.961 | 32.677 | −25.968 | ∞ | DOE | 1.5745 | 33.8 |
| 9 | 0.000 | −3.399 | 33.576 | −25.968 | ∞ | SPH | 1.0000 | |
| 10 | 0.000 | −9.446 | 35.399 | −56.139 | 14.4333 | FFS4 | 1.5745 | 33.8 |
| 11 | 0.000 | −18.877 | 41.162 | −96.420 | −79.9863 | FFS5 | −1.5745 | 33.8 |
| 12 | 0.000 | −3.916 | 31.506 | −83.928 | 19.3015 | FFS6 | −1.0000 | |
| I | 0.000 | 8.784 | 30.155 | −123.421 | ∞ | SPH | −1.0000 | |

FFS1　k: 3.8943e+001　　c5: −5.0226e−004　c6: 1.9564e−004　c10: 5.2454e−006
　　　c11: −2.6022e−005　c12: −6.0280e−008　c13: −2.4732e−007　c14: 1.8297e−008
FFS2　k: 9.0852e−001　　c5: −7.4766e−004　c6: −2.5995e−004　c10: −2.8129e−006
　　　c11: −9.0165e−006　c12: −1.2338e−007　c13: 7.6003e−008　c14: 1.4288e−007
FFS3　k: 3.5982e+001　　c5: −3.8187e−003　c6: 2.9264e−004　c10: −1.1347e−004
　　　c11 : 1.0236e−004　c12: 2.8904e−006　c13: −3.2687e−006　c14: 2.0202e−006
FFS4　k: −2.2155e+000　c5: 1.8777e−003c　c6: −1.0615e−003　c10: 2.5755e−004
　　　c11: 8.6464e−005　c12: −1.1919e−008　c13: 1.1051e−005　c14: −8.5536e−006
FFS5　k: −3.8144e+001　c5: 5.2523e−005　c6: 8.9472e−005　c10: 3.1568e−005
　　　c11: 3.0802e−005　c12: 7.5012e−007　c13: 1.9095e−006　c14: −5.7663e−007
FFS6　k: −6.9861e−001　c5: 3.5615e−003　c6: 2.6976e−003　c10: 1.2315e−004
　　　c11: 8.1226e−005　c12: −6.0454e−006　c13: −1.1706e−005　c14: 1.6423e−006
DOE　RDX: ∞
　　　c3: 8.6489e−003　c5: 2.3731e−003　c7: −1.3028e−004　c9: 5.2552e−005
　　　c10: 2.6857e−005　c12: 4.3924e−005　c14: 2.3239e−005　c16: 1.7807e−006
　　　c18: 4.9269e−007　c20: −3.6108e−007　c21: −9.6098e−009　c23: −1.8309e−007
　　　c25: −2.8997e−007　c27: −1.3766e−007 ry: ∞  rx: ∞
|ry/rx| = 1
|θ| = 7.28086

What is claimed is:

1. An optical system, comprising:
a plurality of optical surfaces including a first surface on which light rays from an object are reflected, and a second surface reflecting the light rays reflected by the first surface back toward the first surface;
wherein the first surface reflects a central field-angle principal ray, which comes from the second surface and is again reflected on the first surface, to the opposite side of the previous reflection with respect to a normal at a hit point of the central field-angle principal ray on the first surface; and
wherein the plurality of optical surfaces includes a diffractive optical surface.

2. The optical system according to claim 1, wherein the first surface is decentered with respect to the light rays from the object.

3. The optical system according to claim 1, wherein the second surface is the diffractive optical surface.

4. The optical system according to claim 1, wherein the first surface and the second surface are formed on a transparent member filled with an optical medium.

5. The optical system according to claim 1, wherein the diffractive optical surfaces is one of the plurality of optical surfaces other than the first and the second surface.

6. The optical system according to claim 5,
wherein the first and the second surfaces are formed on a first transparent member filled with an optical medium; and
wherein the diffractive optical surface, which is not the first or the second surface, is formed on a second transparent member filled with an optical medium.

7. The optical system according to claim 1, wherein the diffractive optical surface is a rotationally symmetric curved surface and has a phase distribution on the curved surface.

8. The optical system according to claim 7, wherein the phase distribution is rotationally symmetric.

9. The optical system according to claim 7, wherein the phase distribution is rotationally asymmetric.

10. The optical system according to claim 1, wherein the diffractive optical surface is a rotationally asymmetric curved surface and has a phase distribution on the curved surface.

11. The optical system according to claim 10, wherein the phase distribution is rotationally symmetric.

12. The optical system according to claim 10, wherein the phase distribution is rotationally asymmetric.

13. The optical system according to claim 1, wherein the diffractive optical surface has a reflective action.

14. The optical system according to claim 1, wherein the diffractive optical surface has a transmissive action.

15. The optical system according to claim 1, wherein the light rays from the object form an intermediate image inside the optical system.

16. The optical system according to claim 15, wherein the diffractive optical surface is arranged between the object and the intermediate image.

17. The optical system according to claim 16, wherein the diffractive optical surface is provided at a position which is closer to a pupil image-forming position of the light rays from the object than to the object.

18. The optical system according to claim 1, further comprising a third surface;

wherein the first, the second and the third surface are formed on a transparent member filled with an optical medium;

wherein the light rays incident on the transparent member emerge from the transparent member after traveling along an optical path including, in order, being transmitted through the third surface, being reflected at the first surface, being reflected at the second surface, being reflected at the first surface, being reflected at the third surface, and being transmitted through the first surface.

19. The optical system according to claim 18, wherein the following condition is satisfied:

$|\theta|<60°$ where $\theta$ is an angle formed by the central field-angle principal ray which is first incident on the second surface after being reflected by the first surface and its reflected light ray.

20. The optical system according to claim 1, further comprising a third surface;

wherein the first, the second and the third surface are formed on a transparent member filled with an optical medium;

wherein the light rays incident on the transparent member emerge from the transparent member after traveling along an optical path including, in order, being transmitted through the first surface, being reflected at the third surface, being reflected at the first surface, being reflected at the second surface, being reflected at the first surface, and being transmitted through the third surface.

21. The optical system according to claim 20, wherein the following condition is satisfied:

$|\theta|<60°$ where $\theta$ is an angle formed by the central field-angle principal ray which is first incident on the second surface after being reflected by the first surface and its reflected light ray.

22. The optical system according to claim 1, further comprising a third surface;

wherein the first, the second and the third surface are formed on a transparent member filled with an optical medium;

wherein the light rays incident on the transparent member emerge from the transparent member after traveling along an optical path including, in order, being transmitted through the third surface, being reflected at the first surface, being reflected at the second surface, being reflected at the first surface, being reflected at the second surface, being reflected at the first surface, being reflected at the third surface, and being transmitted through the first surface.

23. The optical system according to claim 22, wherein the following condition is satisfied:

$|\theta|<60°$ where $\theta$ is an angle formed by the central field-angle principal ray which is first incident on the first surface after being reflected by the second surface and its reflected light ray.

24. The optical system according to claim 1, further comprising a third surface;

wherein the first, the second and the third surface are formed on a transparent member filled with an optical medium;

wherein the light rays incident on the transparent member emerge from the transparent member after traveling along an optical path including, in order, being transmitted through the first surface, being reflected at the third surface, being reflected at the first surface, being reflected at the second surface, being reflected at the first surface, being reflected at the second surface, being reflected at the first surface, and being transmitted through the third surface.

25. The optical system according to claim 24, wherein the following condition is satisfied:

$|\theta|<60°$ where $\theta$ is an angle formed by the central field-angle principal ray which is first incident on the first surface after being reflected by the second surface and its reflected light ray.

26. A display optical system, comprising:
an image-forming device forming an original image; and
an optical system according to claim 1 guiding light rays from the original image to a viewer's eye or to a projection surface.

27. An image-taking optical system comprising:
a photoelectric conversion device;
an optical system according to claim 1 forming an object image on a light-receiving surface of the photoelectric conversion device.

* * * * *